(12) United States Patent
Appelman

(10) Patent No.: US 8,706,826 B2
(45) Date of Patent: *Apr. 22, 2014

(54) AUTOMATICALLY ENABLING THE FORWARDING OF INSTANT MESSAGES

(75) Inventor: Barry Appelman, McLean, VA (US)

(73) Assignee: Bright Sun Technologies, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/274,076

(22) Filed: Oct. 14, 2011

(65) Prior Publication Data

US 2012/0083297 A1     Apr. 5, 2012

Related U.S. Application Data

(63) Continuation of application No. 11/720,726, filed as application No. PCT/US2005/042992 on Nov. 30, 2005, now Pat. No. 8,060,566.

(60) Provisional application No. 60/631,876, filed on Dec. 1, 2004.

(51) Int. Cl.
    *G06F 15/16*     (2006.01)

(52) U.S. Cl.
    USPC ............ 709/206; 709/217; 709/218; 709/219

(58) Field of Classification Search
    USPC ......................................... 709/206, 217–219
    See application file for complete search history.

(56) References Cited

U.S. PATENT DOCUMENTS

| | | | |
|---|---|---|---|
| 4,837,798 A | 6/1989 | Cohen et al. | |
| 5,086,394 A | 2/1992 | Shapira | |
| 5,276,905 A | 1/1994 | Hurst et al. | |
| 5,315,636 A | 5/1994 | Patel | |
| 5,548,637 A | 8/1996 | Heller et al. | |
| 5,673,308 A | 9/1997 | Akhavan | |

(Continued)

FOREIGN PATENT DOCUMENTS

| | | | |
|---|---|---|---|
| GB | 2357932 A | 4/2001 | |
| GB | 2368747 A | 8/2002 | |

(Continued)

OTHER PUBLICATIONS

Androutsopoulos, "Learning to Filter Spam E-Mail: A Comparison of a Naive Bayesian and a Memory-Based Approach," University of Athens, Sep. 2000, 12 pages.

(Continued)

*Primary Examiner* — Mohamed Wasel
(74) *Attorney, Agent, or Firm* — Fenwick & West LLP

(57) ABSTRACT

In some examples, an instant message addressed to an intended instant messaging recipient may be forwarded to the recipient's mobile telephone when the recipient's mobile telephone number is known to the instant message sender. In one example, an instant message is forwarded to the intended recipient's mobile telephone number when the instant message sender's contact information for the intended recipient includes an instant message address (e.g., a screen name or other type of instant message identifier) and a mobile telephone number, without dependence upon the intended recipient's presence on the instant message (IM) system or through actual login or registration with an IM forwarding service. In another example, an instant message addressed to an intended instant messaging recipient is forwarded to the recipient's mobile telephone when the recipient is known to the instant message sender.

28 Claims, 12 Drawing Sheets

(56) References Cited

U.S. PATENT DOCUMENTS

| | | |
|---|---|---|
| 5,742,905 A | 4/1998 | Pepe et al. |
| 5,793,365 A | 8/1998 | Tang et al. |
| 5,802,470 A | 9/1998 | Gaulke et al. |
| 5,867,162 A | 2/1999 | O'Leary et al. |
| 5,870,744 A | 2/1999 | Sprague |
| 5,872,521 A | 2/1999 | Lopatukin et al. |
| 5,913,032 A | 6/1999 | Schwartz et al. |
| 5,940,488 A | 8/1999 | DeGrazia et al. |
| 5,946,616 A | 8/1999 | Schornack et al. |
| 5,946,617 A | 8/1999 | Portaro et al. |
| 5,946,630 A | 8/1999 | Willars et al. |
| 5,950,193 A | 9/1999 | Kulkarni |
| 5,960,173 A | 9/1999 | Tang et al. |
| 5,978,673 A | 11/1999 | Alperovich et al. |
| 5,987,113 A | 11/1999 | James |
| 5,999,932 A | 12/1999 | Paul |
| 6,038,451 A | 3/2000 | Syed et al. |
| 6,049,533 A | 4/2000 | Norman et al. |
| 6,065,047 A | 5/2000 | Carpenter et al. |
| 6,073,138 A | 6/2000 | de l'Etraz et al. |
| 6,088,435 A | 7/2000 | Barber et al. |
| 6,091,948 A | 7/2000 | Carr et al. |
| 6,134,432 A | 10/2000 | Holmes et al. |
| 6,141,545 A | 10/2000 | Begeja et al. |
| 6,161,130 A | 12/2000 | Horvitz et al. |
| 6,167,256 A | 12/2000 | Yla-Outinen et al. |
| 6,175,831 B1 | 1/2001 | Weinreich et al. |
| 6,189,026 B1 | 2/2001 | Birrell et al. |
| 6,199,099 B1 | 3/2001 | Gershman et al. |
| 6,199,103 B1 | 3/2001 | Sakaguchi et al. |
| 6,212,550 B1 | 4/2001 | Segur |
| 6,247,043 B1 | 6/2001 | Bates et al. |
| 6,260,148 B1 | 7/2001 | Aggarwal et al. |
| 6,269,369 B1 | 7/2001 | Robertson |
| 6,301,609 B1 | 10/2001 | Aravamudan et al. |
| 6,324,541 B1 | 11/2001 | de l'Etraz et al. |
| 6,330,590 B1 | 12/2001 | Cotten |
| 6,347,332 B1 | 2/2002 | Malet et al. |
| 6,349,299 B1 | 2/2002 | Spencer et al. |
| 6,360,251 B1 | 3/2002 | Fujita et al. |
| 6,363,248 B1 | 3/2002 | Silverman |
| 6,374,246 B1 | 4/2002 | Matsuo |
| 6,374,290 B1 | 4/2002 | Scharber et al. |
| 6,389,127 B1 | 5/2002 | Vardi et al. |
| 6,389,372 B1 | 5/2002 | Glance et al. |
| 6,392,669 B1 | 5/2002 | Matoba et al. |
| 6,415,318 B1 | 7/2002 | Aggarwal et al. |
| 6,421,709 B1 | 7/2002 | McCormick et al. |
| 6,430,604 B1 | 8/2002 | Ogle et al. |
| 6,449,344 B1 | 9/2002 | Goldfinger et al. |
| 6,449,634 B1 | 9/2002 | Capiel |
| 6,457,044 B1 | 9/2002 | IwaZaki |
| 6,463,471 B1 | 10/2002 | Dreke et al. |
| 6,505,167 B1 | 1/2003 | Horvitz et al. |
| 6,507,866 B1 | 1/2003 | Barchi |
| 6,539,421 B1 | 3/2003 | Appelman et al. |
| 6,549,933 B1 | 4/2003 | Barrett et al. |
| 6,549,937 B1 | 4/2003 | Auerbach et al. |
| 6,557,027 B1 | 4/2003 | Cragun |
| 6,564,261 B1 | 5/2003 | Gudjonsson et al. |
| 6,564,264 B1 | 5/2003 | Creswell et al. |
| 6,567,796 B1 | 5/2003 | Yost et al. |
| 6,571,234 B1 | 5/2003 | Knight et al. |
| 6,604,133 B2 | 8/2003 | Aggarwal et al. |
| 6,608,637 B1 | 8/2003 | Beaton et al. |
| 6,615,241 B1 | 9/2003 | Miller et al. |
| 6,625,423 B1 | 9/2003 | Wang |
| 6,636,733 B1 | 10/2003 | Helferich |
| 6,639,299 B2 | 10/2003 | Aoki |
| 6,643,669 B1 | 11/2003 | Novak et al. |
| 6,647,259 B1 | 11/2003 | Boyle et al. |
| 6,658,095 B1 | 12/2003 | Yoakum et al. |
| 6,677,968 B1 | 1/2004 | Appelman |
| 6,678,719 B1 | 1/2004 | Stimmel |
| 6,687,362 B1 | 2/2004 | Lindquist et al. |
| 6,691,162 B1 | 2/2004 | Wick |
| 6,694,353 B2 | 2/2004 | Sommerer |
| 6,701,348 B2 | 3/2004 | Sommerer |
| 6,714,793 B1 | 3/2004 | Carey et al. |
| 6,728,357 B2 | 4/2004 | O'Neal et al. |
| 6,731,308 B1 | 5/2004 | Tang et al. |
| 6,750,881 B1 | 6/2004 | Appelman |
| 6,760,580 B2 | 7/2004 | Robinson et al. |
| 6,772,188 B1 | 8/2004 | Cloutier |
| 6,781,608 B1 | 8/2004 | Crawford |
| 6,785,554 B1 | 8/2004 | Amerga |
| 6,788,769 B1 | 9/2004 | Waites |
| 6,799,039 B2 | 9/2004 | Wu et al. |
| 6,800,031 B2 | 10/2004 | Di Cesare |
| 6,904,026 B1 | 6/2005 | Tarnanen et al. |
| 6,907,243 B1 | 6/2005 | Patel |
| 6,912,563 B1 | 6/2005 | Parker et al. |
| 6,917,965 B2 | 7/2005 | Gupta et al. |
| 6,920,478 B2 | 7/2005 | Mendiola et al. |
| 6,957,077 B2 | 10/2005 | Dehlin |
| 7,120,455 B1 | 10/2006 | Chen et al. |
| 7,124,123 B1 | 10/2006 | Roskind et al. |
| 7,127,232 B2 | 10/2006 | O'Neil et al. |
| 7,190,956 B2 | 3/2007 | Dorenbosch et al. |
| 7,269,629 B2 | 9/2007 | Zmudzinski et al. |
| 7,287,097 B1 | 10/2007 | Friend et al. |
| 7,308,082 B2 | 12/2007 | Davis et al. |
| 7,319,882 B2 | 1/2008 | Mendiola et al. |
| 7,321,920 B2 | 1/2008 | Washburn |
| 7,321,921 B2 | 1/2008 | Malik |
| 7,330,713 B2 | 2/2008 | Zhu |
| 7,353,015 B1 | 4/2008 | Tenhunen |
| 7,370,278 B2 | 5/2008 | Malik et al. |
| 7,373,383 B2 | 5/2008 | Boss et al. |
| 7,403,970 B1 | 7/2008 | Kamble et al. |
| 7,403,972 B1 | 7/2008 | Lau et al. |
| 7,409,428 B1 | 8/2008 | Brabec et al. |
| 7,412,231 B1 | 8/2008 | Kelleher |
| 7,428,580 B2 | 9/2008 | Hullfish et al. |
| 7,428,590 B2 | 9/2008 | Miller et al. |
| 7,512,407 B2 | 3/2009 | Wu et al. |
| 7,519,675 B2 | 4/2009 | Di Giorgio et al. |
| 7,555,520 B2 | 6/2009 | Watanabe et al. |
| 7,564,958 B1 | 7/2009 | Contractor |
| 7,590,696 B1 | 9/2009 | Odell et al. |
| 7,603,421 B1 | 10/2009 | Roche et al. |
| 7,606,864 B2 | 10/2009 | Koch |
| 7,640,293 B2 | 12/2009 | Wilson et al. |
| 7,653,389 B2 | 1/2010 | Eales et al. |
| 7,657,253 B2 | 2/2010 | Lewis |
| 7,660,856 B2 | 2/2010 | O'Brien et al. |
| 7,660,864 B2 | 2/2010 | Markki et al. |
| 7,668,535 B2 | 2/2010 | Conneely et al. |
| 7,668,917 B2 | 2/2010 | Netsch et al. |
| 7,680,887 B2 | 3/2010 | Kiss et al. |
| 7,765,262 B2 | 7/2010 | Gross et al. |
| 7,765,263 B2 | 7/2010 | Alfke |
| 7,792,906 B2 | 9/2010 | Garcia-Martin et al. |
| 7,848,744 B2 | 12/2010 | Eason et al. |
| 7,853,652 B2 | 12/2010 | McCarty |
| 7,890,586 B1 | 2/2011 | McNamara et al. |
| 7,895,263 B1 | 2/2011 | Kirchmeier et al. |
| 7,895,273 B1 | 2/2011 | Haldar |
| 7,895,314 B1 | 2/2011 | Russell |
| 7,912,899 B2 | 3/2011 | Beauchamp et al. |
| 7,912,903 B2 | 3/2011 | Shah |
| 7,924,811 B2 | 4/2011 | Asokan |
| 7,945,623 B2 | 5/2011 | Simpson |
| 7,961,663 B2 | 6/2011 | Lin |
| 7,975,009 B2 | 7/2011 | Wilensky |
| 8,005,461 B2 | 8/2011 | Vander Veen et al. |
| 8,046,008 B2 | 10/2011 | Park et al. |
| 8,103,722 B2 | 1/2012 | Lee |
| 8,122,084 B2 | 2/2012 | Beringer |
| RE43,284 E | 3/2012 | Degraeve |
| 8,131,803 B2 | 3/2012 | Hardy et al. |
| 8,150,925 B2 | 4/2012 | Zimmers et al. |
| 8,161,116 B2 | 4/2012 | Chaddha et al. |
| 8,243,893 B2 | 8/2012 | Hayes, Jr. et al. |

(56) References Cited

U.S. PATENT DOCUMENTS

| | | | |
|---|---|---|---|
| 8,370,756 B2 | 2/2013 | Malik et al. | |
| 8,443,049 B1 | 5/2013 | Geddes | |
| 8,483,729 B2 | 7/2013 | Knotts | |
| 8,516,055 B2 | 8/2013 | Hind et al. | |
| 2001/0002469 A1 | 5/2001 | Bates et al. | |
| 2001/0003202 A1 | 6/2001 | Mache et al. | |
| 2001/0003203 A1 | 6/2001 | Mache | |
| 2001/0005861 A1 | 6/2001 | Mousseau et al. | |
| 2001/0013050 A1 | 8/2001 | Shah | |
| 2002/0049610 A1 | 4/2002 | Gropper | |
| 2002/0049751 A1 | 4/2002 | Chen et al. | |
| 2002/0052921 A1 | 5/2002 | Morkel | |
| 2002/0065828 A1 | 5/2002 | Goodspeed | |
| 2002/0065894 A1* | 5/2002 | Dalal et al. | 709/206 |
| 2002/0083127 A1 | 6/2002 | Agrawal | |
| 2002/0083136 A1 | 6/2002 | Whitten, II | |
| 2002/0087634 A1 | 7/2002 | Ogle et al. | |
| 2002/0087704 A1 | 7/2002 | Chesnais et al. | |
| 2002/0091667 A1 | 7/2002 | Jaipuria et al. | |
| 2002/0097856 A1 | 7/2002 | Wullert, II | |
| 2002/0103801 A1 | 8/2002 | Lyons | |
| 2002/0116461 A1 | 8/2002 | Diacakis et al. | |
| 2002/0116563 A1 | 8/2002 | Lever | |
| 2002/0116641 A1 | 8/2002 | Mastrianni | |
| 2002/0117733 A1 | 8/2002 | Racanelli | |
| 2002/0120687 A1 | 8/2002 | Diacakis et al. | |
| 2002/0120697 A1 | 8/2002 | Generous et al. | |
| 2002/0137530 A1 | 9/2002 | Karve | |
| 2002/0169748 A1 | 11/2002 | Macholda | |
| 2002/0175953 A1 | 11/2002 | Lin | |
| 2002/0178161 A1 | 11/2002 | Brezin et al. | |
| 2002/0181703 A1 | 12/2002 | Logan et al. | |
| 2002/0184089 A1 | 12/2002 | Tsou et al. | |
| 2002/0199095 A1 | 12/2002 | Bandini et al. | |
| 2003/0004855 A1 | 1/2003 | Dutta et al. | |
| 2003/0004872 A1 | 1/2003 | Gardi et al. | |
| 2003/0018726 A1* | 1/2003 | Low et al. | 709/206 |
| 2003/0023875 A1 | 1/2003 | Hursey et al. | |
| 2003/0028524 A1 | 2/2003 | Keskar et al. | |
| 2003/0028595 A1 | 2/2003 | Vogt et al. | |
| 2003/0037112 A1 | 2/2003 | Fitzpatrick et al. | |
| 2003/0050916 A1 | 3/2003 | Ortega et al. | |
| 2003/0058478 A1 | 3/2003 | Aoki | |
| 2003/0065724 A1 | 4/2003 | Clark | |
| 2003/0088633 A1 | 5/2003 | Chiu et al. | |
| 2003/0101343 A1 | 5/2003 | Eaton et al. | |
| 2003/0105822 A1 | 6/2003 | Gusler et al. | |
| 2003/0112225 A1 | 6/2003 | Granberg | |
| 2003/0131061 A1 | 7/2003 | Newton et al. | |
| 2003/0135569 A1 | 7/2003 | Khakoo et al. | |
| 2003/0154257 A1 | 8/2003 | Hantsch et al. | |
| 2003/0158860 A1 | 8/2003 | Caughey | |
| 2003/0158864 A1 | 8/2003 | Samn | |
| 2003/0167324 A1 | 9/2003 | Farnham et al. | |
| 2003/0187813 A1 | 10/2003 | Goldman et al. | |
| 2003/0208545 A1 | 11/2003 | Eaton et al. | |
| 2003/0217109 A1 | 11/2003 | Ordille et al. | |
| 2003/0219104 A1 | 11/2003 | Malik | |
| 2003/0219109 A1 | 11/2003 | Malik | |
| 2003/0220946 A1 | 11/2003 | Malik | |
| 2003/0220976 A1 | 11/2003 | Malik | |
| 2003/0229722 A1 | 12/2003 | Beyda | |
| 2004/0019695 A1 | 1/2004 | Fellenstein et al. | |
| 2004/0029572 A1 | 2/2004 | Nerot | |
| 2004/0039630 A1 | 2/2004 | Begole et al. | |
| 2004/0044536 A1 | 3/2004 | Fitzpatrick et al. | |
| 2004/0054646 A1 | 3/2004 | Daniell et al. | |
| 2004/0054736 A1 | 3/2004 | Daniell et al. | |
| 2004/0059781 A1 | 3/2004 | Yoakum et al. | |
| 2004/0073643 A1 | 4/2004 | Hayes et al. | |
| 2004/0078445 A1 | 4/2004 | Malik | |
| 2004/0117443 A1 | 6/2004 | Barsness | |
| 2004/0122810 A1 | 6/2004 | Mayer | |
| 2004/0128310 A1 | 7/2004 | Zmudzinski et al. | |
| 2004/0158610 A1 | 8/2004 | Davis et al. | |
| 2004/0165705 A1 | 8/2004 | Cragun | |
| 2004/0179039 A1 | 9/2004 | Blattner et al. | |
| 2004/0199649 A1 | 10/2004 | Tarnanen et al. | |
| 2004/0215721 A1 | 10/2004 | Szeto et al. | |
| 2004/0254998 A1 | 12/2004 | Horvitz | |
| 2004/0267531 A1 | 12/2004 | Whynot et al. | |
| 2005/0013426 A1* | 1/2005 | Ooki | 379/211.02 |
| 2005/0027382 A1 | 2/2005 | Kirmse et al. | |
| 2005/0050143 A1 | 3/2005 | Gusler et al. | |
| 2005/0076241 A1 | 4/2005 | Appelman | |
| 2005/0114229 A1 | 5/2005 | Ackley et al. | |
| 2005/0114533 A1 | 5/2005 | Hullfish et al. | |
| 2005/0187781 A1 | 8/2005 | Christensen | |
| 2005/0198321 A1 | 9/2005 | Blohm | |
| 2005/0210148 A1 | 9/2005 | Kato et al. | |
| 2005/0220134 A1 | 10/2005 | Lin | |
| 2006/0005133 A1* | 1/2006 | Lyle et al. | 715/708 |
| 2006/0025164 A1 | 2/2006 | Wang et al. | |
| 2006/0041684 A1 | 2/2006 | Daniell et al. | |
| 2006/0129643 A1 | 6/2006 | Nielson et al. | |
| 2006/0190117 A1* | 8/2006 | Weczorek et al. | 700/103 |
| 2006/0190543 A1 | 8/2006 | Pulver et al. | |
| 2008/0140827 A1* | 6/2008 | Ma | 709/224 |
| 2008/0256257 A1 | 10/2008 | Miller et al. | |
| 2009/0006555 A1 | 1/2009 | Curran et al. | |
| 2009/0044252 A1* | 2/2009 | Kashima et al. | 726/3 |
| 2009/0234922 A1* | 9/2009 | Appelman | 709/206 |
| 2010/0005523 A1* | 1/2010 | Hassan et al. | 726/19 |
| 2011/0289170 A1 | 11/2011 | Smith et al. | |
| 2012/0083297 A1 | 4/2012 | Appelman | |
| 2013/0073653 A1 | 3/2013 | Heikes et al. | |
| 2013/0073657 A1 | 3/2013 | Hullfish et al. | |
| 2013/0138752 A1 | 5/2013 | Guthrie et al. | |
| 2013/0172026 A1 | 7/2013 | Odell et al. | |

FOREIGN PATENT DOCUMENTS

| | | |
|---|---|---|
| WO | WO98/47270 A2 | 10/1998 |
| WO | WO99/34628 A1 | 7/1999 |
| WO | WO00/79396 A1 | 12/2000 |
| WO | WO01/67787 A2 | 9/2001 |
| WO | WO01/06748 A1 | 12/2001 |
| WO | WO02/03216 A1 | 1/2002 |

OTHER PUBLICATIONS

Boyd, "Reflections on Friendster, Trust and Intimacy," School of Information Management & Systems, 4 pages.

Boyd et al., "Social Network Fragments: An Interactive Tool for Exploring Digital Social Connections," ACM 2003, 1 page.

Business Wire, "BestCalls.com Announces the BestCalls Technology Index," Business Wire, 1999, 3 pages.

Drucker et al., "Support Vector Machines for Spam Categorization," IEEE Transactions on Neural Networks, vol. 10, No. 5, Sep. 1999, pp. 1048-1054.

Dyson, "Social Networking for Business: Release 0.5," Esther Dyson's Monthly Report, vol. 21, No. 10, Nov. 25, 2003, 36 pages.

Glasner, "Social Nets Find Friends in VCs," Retrieved from <<http://www.wired.com/culture/lifestyle/news/2003/11/61227?currentPage=all>> on Jan. 16, 2013, Nov. 17, 2003.

Graham, "Better Bayesian Filter," Retrieved at <<http://paulgraham.com/better.html>> on Jan. 17, 2012, 11 pages.

Gupta et al., "A Reputation for Peer-to-Peer Networks," NOSSDAV '03, Monterey, CA, Jun. 1-3, 2003, 9 pages.

Gupta et al., "A Reputation System for Peer-to-Peer Networks," Jun. 1-3, 2003, Monterey, CA, 9 pages.

Halfbakery, "Degrees of Seperation Email Spam Protection," Halfbakery: Degrees of Separation Email Spam Protection, Retrieved on Jan. 17, 2013, 4 pages.

Hall, "A Countermeasure to Duplicate-detecting Anti-spam Techniques," AT&T Labs Technical Report 99.9.1, 1999, 27 pages.

Hattori et al., "Socialware: Multiagent Systems for Supporting Network Communities," Association for Computing Machinery, Inc., Mar. 1999, 5 pages.

Hearst, "Support Vector Machines," IEEE Intelligent Systems, Jul./Aug. 1998, pp. 18-28.

(56) References Cited

OTHER PUBLICATIONS

Hird, "Technical Solutions for Controlling Spam," Proceedings of AUUG2002, Melbourne, Sep. 4-6, 2002, 17 pages.

"How to turn off IM forwarding for AIM Mobile", bigblueball.com, Mar. 12, 2010, Retrieved from <<http://www.bigblueball.com/forums/aim-support/15256-how-turn-off-im-forwarding-aim-mobile-3.html,>> 3 pages.

PCT Search Report & Written Opinion for Application No. PCT/US05/42992, mailed on Mar. 6, 2007, 14 pages.

Jensen et al., "Finding Others Online: Reputation Systems for Social Online Spaces," CHI 2002, Apr. 20-25, 2002, Minneapolis, MN, 8 pages.

Joachims, "Text Categorization with Support Vector Machines: Learning with Many Relevant Features," University of Dortmund, 1998, 6 pages.

Kahney, "Will You Buy a Car From This Man," Retrieved from <<http://www.wired.com/techbiz/media/news/2003/10/60703>> on Jan. 17, 2013, Oct. 6, 2003, 2 pages.

Kolcz et al., "SVM-based Filtering of E-mail Spam with Content-specific Misclassification Costs", TextDM'2001 (IEEE ICDM-2001 (Workshop on Text Mining), San Jose, CA 2001, pp. 1-14.

Liener, "SWF Seeks Attractive Head Shot; To Stand Out, Online Daters Pay for Professional Photos; Cropping Out the Ecx-Wife," The Wall Street Journal, Nov. 19, 2003, 4 pages.

Riordan, "Idea for Online Networking Brings Two Entrepreneurs Together," The New York Times, Dec. 1, 2003, 2 pages.

Tang et al., "ConNexus to Awarenex: Extending awareness to mobile users," SIGCHI '01, Seattle, WA, Mar. 31-Apr. 4, 2001, 8 pages.

Tang et al., "ConNexus to Awarnex: Extending awareness to mobile users," Sun Microsystems Laboratories, SIGCHI '01, Mar. 31-Apr. 5, 2001, Seattle, WA, 8 pages.

"Trillian Pro 2.0," Cerulean Studios, 1999, Retrieved from <<http://web.archive.org/web/20031118192623/www.ceruleanstudios.com/,>> 21 pages.

"Trillian Pro User Manual," Cerulean Studios, 1999, Retrieved from <<http://web.archive.org/web/20040409110818/www.ceruleanstudios.eom/support/manual.php,>> 70 pages.

"Trillian Pro: No Boundaries," Cerulean Studios, 1999, 16 pages.

"Trillian: Your Freedom to Chat," Cerulean Studios, 1999, 8 pages.

Viegas et al., "Digital Artifacts for Remembering and Storytelling: PostHistory and Social Network Fragments," Proceedings of the 37th Hawaii International Conference on System Sciences—2004, Jan. 2004, 10 pages.

Wagner, "Spoke Builds on Social Networking Patent Portfolio," www.InternetNews.com, Retrieved on Jan. 16, 2013, Sep. 8, 2003, 1 page.

"Yahoo! Messenger Help", Yahoo! Inc., 2002, 4 pages.

United States Office Action, U.S. Appl. No. 11/017,202, Aug. 21, 2013, 16 pages.

United States Office Action, U.S. Appl. No. 12/662,909, Sep. 13, 2013, 12 pages.

United States Office Action, U.S. Appl. No. 11/017,202, Feb. 5, 2014, 20 pages.

\* cited by examiner

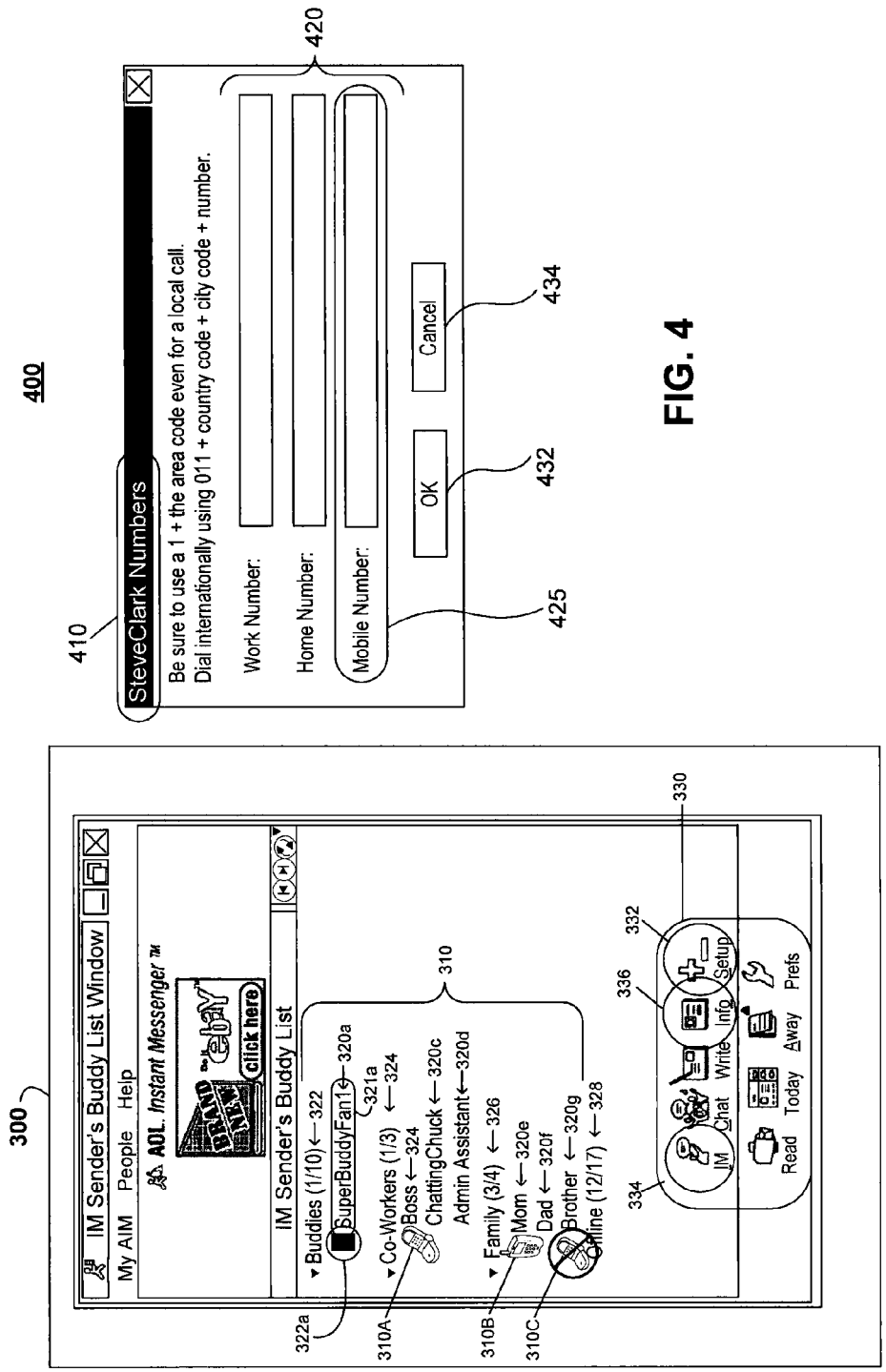

AUTOMATICALLY ENABLING THE FORWARDING OF INSTANT MESSAGES

CROSS REFERENCE TO RELATED APPLICATIONS

This application is a continuation of U.S. patent application Ser. No. 11/720,726, filed Oct. 1, 2008, titled AUTOMATICALLY ENABLING THE FORWARDING OF INSTANT MESSAGES, which claims the benefit of U.S. Provisional Application No. 60/631,876, filed Dec. 1, 2004, titled AUTOMATICALLY ENABLING THE FORWARDING OF INSTANT MESSAGES. The disclosures of the above-referenced applications are expressly incorporated herein by reference to their entireties.

TECHNICAL FIELD

This description relates to communicating using an instant messaging system.

BACKGROUND

Users of an instant messaging service can communicate in virtually real time with other instant messaging users. Users may manually create a buddy list of user names of other users of the instant messaging service, and may establish instant messaging sessions with those other members using the buddy list.

SUMMARY

In one general aspect communicating using electronic devices includes receiving an electronic message and an indication of a sender-specified destination for the electronic message. A determination is made as to whether the destination is available to receive an electronic message using a first mode of communication, and a determination is made as to whether a mobile telephone number is known by the sender to be associated with the destination. A determination whether to transmit a communication based on the electronic message using the mobile telephone number is made based on a determination that the destination is not available and that the mobile telephone number is known by the sender to be associated with the destination.

Implementations may include one or more of the following features. For example, the electronic message may be an instant message, and the destination may be an instant message identity. The instant message identity may be an identity that is not signed on to an instant message service, and determining whether the destination is available to receive an electronic message using a first mode of communication may include determining whether the instant message identity is signed on to an instant message service. A determination may be made that the destination is not available if the instant message identity is not signed on to the instant message service.

The instant message identity may be an identity that is signed on to an instant message service and is associated with an idle state. Determining whether the destination is available to receive an electronic message using a first mode of communication may include determining whether the instant message identity is signed on to an instant message service and determining whether the instant message identity is associated with an idle state if the instant message identity is determined to be signed on to the instant message service. A determination may be made that the destination is not available if the instant message identity is signed on to the instant message service and the instant message identity is associated with an idle state.

Determining whether the mobile telephone number is known by the sender to be associated with the destination may include searching electronic storage for an association of the mobile telephone number and an instant message identity. Determining whether a mobile telephone number is known by the sender to be associated with the destination may include identifying, in a collection of contact information associated with the sender, a stored association of the mobile telephone number and the instant message identity. The collection of contact information may include an address book associated with the sender or a buddy list associated with the sender. Determining whether the mobile telephone number is known by the sender may include searching the collection of contact information associated with the sender for a mobile telephone number associated with an instant message identity.

The instant message identity may be associated with a screen name, and searching the collection of contact information associated with the sender for a mobile telephone number associated with an instant message identity may include searching the collection of contact information associated with the sender for a mobile telephone number associated with the screen name associated the instant message identity.

A user name associated with the instant message identity may be identified in a buddy list associated with the sender. Searching the collection of contact information associated with the sender for a mobile telephone number associated with an instant message identity may include searching the collection of contact information associated with the sender for the user name. Determining that the mobile telephone number is known by the sender to be associated with the instant message identity may include identifying, in the collection of contact information associated with the sender, a stored association of the mobile telephone number and the user name.

A host system may perform the receiving, the determining of whether the instant message identity is available, the determining of whether the mobile telephone number is known by the sender to be associated with the instant message identity, and the determining of whether to transmit the communication. A client system may perform the receiving, the determining of whether the destination is available, the determining of whether the mobile telephone number is known by the sender to be associated with the destination, and the determining of whether to transmit the communication.

A text message may be sent to the mobile telephone number such that the text message is based on text of the electronic message. A text message may be forwarded to the mobile telephone number such that the text message is based on text of the electronic message.

Confirmation from the sender to enable transmission to the mobile telephone number may be received, and a determination to transmit may be made only after receiving confirmation from the sender that the electronic message is to be transmitted to the mobile telephone number.

A determination may be made as to whether the destination prohibits transmission of communications to the mobile telephone number based on electronic messages, and a determination to transmit may be made only after a determination is made that the destination does not prohibit transmission of communications to the mobile telephone number based on electronic messages.

An indication of whether the destination prohibits transmissions of communications based on electronic messages to the mobile telephone number may be received. Determining whether the destination prohibits transmission of a communication based on the electronic message to the mobile telephone number may include accessing the indication of whether the instant message identity prohibits transmissions. Determining whether to transmit may include only determining to transmit after a determination is made, based on the accessed indication, that the destination does not prohibit transmissions of communications based on electronic messages to the mobile telephone number.

Determining whether the destination is available to receive an electronic message addressed to the destination may include determining whether the destination is signed on to an instant message service used to send the electronic message, and the determination that the destination is not available may include a determination that the destination is not signed on to the instant message service.

Determining whether the destination is available to receive an electronic message addressed to the destination may include determining whether the destination is signed on to an instant message service used to send the electronic message and determining whether the destination is away from a client system used to access the instant message service, and the determination that the destination is not available may include a determination that the destination is signed on to the instant message service and a determination that the destination is away from the client system.

Determining whether the destination is away from a client system used to access the instant message service may include determining whether a user-configurable away indication is associated with the destination, and the determination that the destination is away from the client system may include a determination that a user-configurable away indication is associated with the destination.

In another general aspect, communicating using electronic devices includes receiving an electronic message and an indication of a sender-specified destination for the electronic message. A determination is made as to whether the destination is available to receive an electronic message using a first mode of communication, and a determination is made as to whether a second destination using a second mode of communication is known by the sender to be associated with the destination. In response to a determination that the destination is not available and that a second destination using a second mode of communication is known by the sender to be associated with the destination, transmission of a communication is enabled to the second destination and using the second mode of communication where the communication is based on the electronic message.

Implementations may include one or more of the features noted above and one or more of the following features. For example, the second destination may be selected, based on a user preference, from multiple destinations. The electronic message may be an instant message, the destination may be an instant message identity, and the first mode of communication may be instant messaging.

The second destination may include a mobile telephone number, and the second mode of communication may include sending a text message. The second destination may include an electronic mail address, and the second mode of communication may include sending an electronic mail message. The second destination may include a telephone number, and the second mode of communication may include sending a voice telephone message. The second destination may include an instant message identity available through a instant messaging service that is different from the instant messaging service that is associated with the destination.

The instant message identity may be an identity that is not signed on to an instant message service, and determining whether the destination is available to receive an electronic message using a first mode of communication may include determining whether the instant message identity is signed on to an instant message service. A determination that the destination is not available may be made if the instant message identity is not signed on to the instant message service.

The instant message identity comprises an identity that is signed on to an instant message service and is associated with an idle state. Determining whether the destination is available to receive an electronic message using a first mode of communication may include determining whether the instant message identity is signed on to an instant message service, and determining whether the instant message identity is associated with an idle state if the instant message identity is determined to be signed on to the instant message service. A determination that the destination is not available may be made if the instant message identity is signed on to the instant message service and the instant message identity is associated with an idle state.

In yet another general aspect, a graphical user interface on a display device of a computer enables using a computer service to communicate. The graphical user interface includes a list of potential message recipients selected by a user as significant to the user. The graphical user interface also includes a user identifier associated with each potential message recipient and configured as a conduit for message delivery to the associated potential message recipient using the computer service. The graphical user interface also includes one or more forwarding indications that indicate whether a message addressed to a potential message recipient is to be forwarded to a mobile telephone number associated with the potential message recipient based on a determination that the mobile telephone number is known by the user to be associated with the potential message recipient.

Implementations may include one or more of the features noted above and one or more of the following features. For example, a forwarding indication may be displayed adjacent to the user identifier for the corresponding potential message recipient. A forwarding indication may include an icon.

A first type of forwarding indication may have a first presentation style that indicates that message forwarding to a mobile telephone number associated with a first potential message recipient associated with the first type of forwarding indication is enabled based on a determination that the mobile telephone number is known by the user to be associated with the potential message recipient. The graphical user interface may include one or more forwarding indications of a second type. A forwarding indication of the second type may have a second presentation style that indicates that message forwarding to a mobile telephone number associated with a second potential message recipient associated with the second type of forwarding indication is enabled such that message forwarding is enabled by the second potential message recipient.

The graphical user interface may include a control for sending a message to at to least one of the potential message recipients. The list of potential message recipients may be an electronic address book or a contact list for the computer service. The computer service may include an instant messaging service, and the list of potential message recipients may be a buddy list. The user identifier may be an address for communication inspired through interaction with the graphical user interface.

The graphical user interface may include a mobile blocking indicator that indicates that message forwarding to a mobile telephone is prohibited by a potential message recipient. The graphical user interface may include a mobile forwarding indication that indicates that a mobile telephone associated with a potential message recipient is capable of receiving a text message.

The list of potential message recipients may include categories of potential message recipients such that a category is associated with one or more potential message recipients. A first category may be associated with one or more potential message recipients that are each associated with a forwarding indication, and a second category may be associated with one or more potential message recipients that are not associated with the first category.

In yet another general aspect, communicating using electronic devices includes receiving an electronic message and an indication of a sender-specified destination for the electronic message. A determination is made as to whether the destination is available to receive an electronic message using a first mode of communication, and a determination is made as to whether an identity associated with the sender-specified destination is known by the sender. A determination is made whether to transmit, using a mobile telephone number associated with the identity, a communication that is based on the electronic message. The determination to transmit is based on a determination that the destination is not available and that an identity associated with the sender-specified destination is known by the sender.

Implementations may include one or more of the features noted above and one or more of the following features. For example, determining whether an identity associated with the sender-specified destination is known by the sender may include inferring that a person is associated with the sender based, at least in part, on inclusion of the person in a contact list of a second person, wherein the second person is not the sender. The mobile telephone number associated with the identity may be determined based on determining a mobile telephone number associated with the person in the contact list of the second person. The contact list may be, for example, an address book associated with the second person or a buddy list associated with the second person.

Implementations of any of the techniques discussed above may include a method or process, a system or apparatus, or computer software on a computer-accessible medium. The details of one or more of the implementations are set forth in the accompanying drawings and description below. Other features will be apparent from the description and drawings, and from the claims.

DESCRIPTION OF DRAWINGS

FIG. 3 is an illustration of an exemplary interface for showing a buddy list that identifies buddies for whom a mobile telephone number is known to the instant messaging identity associated with the buddy list.

FIGS. 4 and 5 are illustrations of exemplary interfaces for associating, in contact information, a mobile telephone number known to an instant message identity with a screen name.

Like reference symbols in the various drawings indicate like elements.

DETAILED DESCRIPTION

Figure 1:
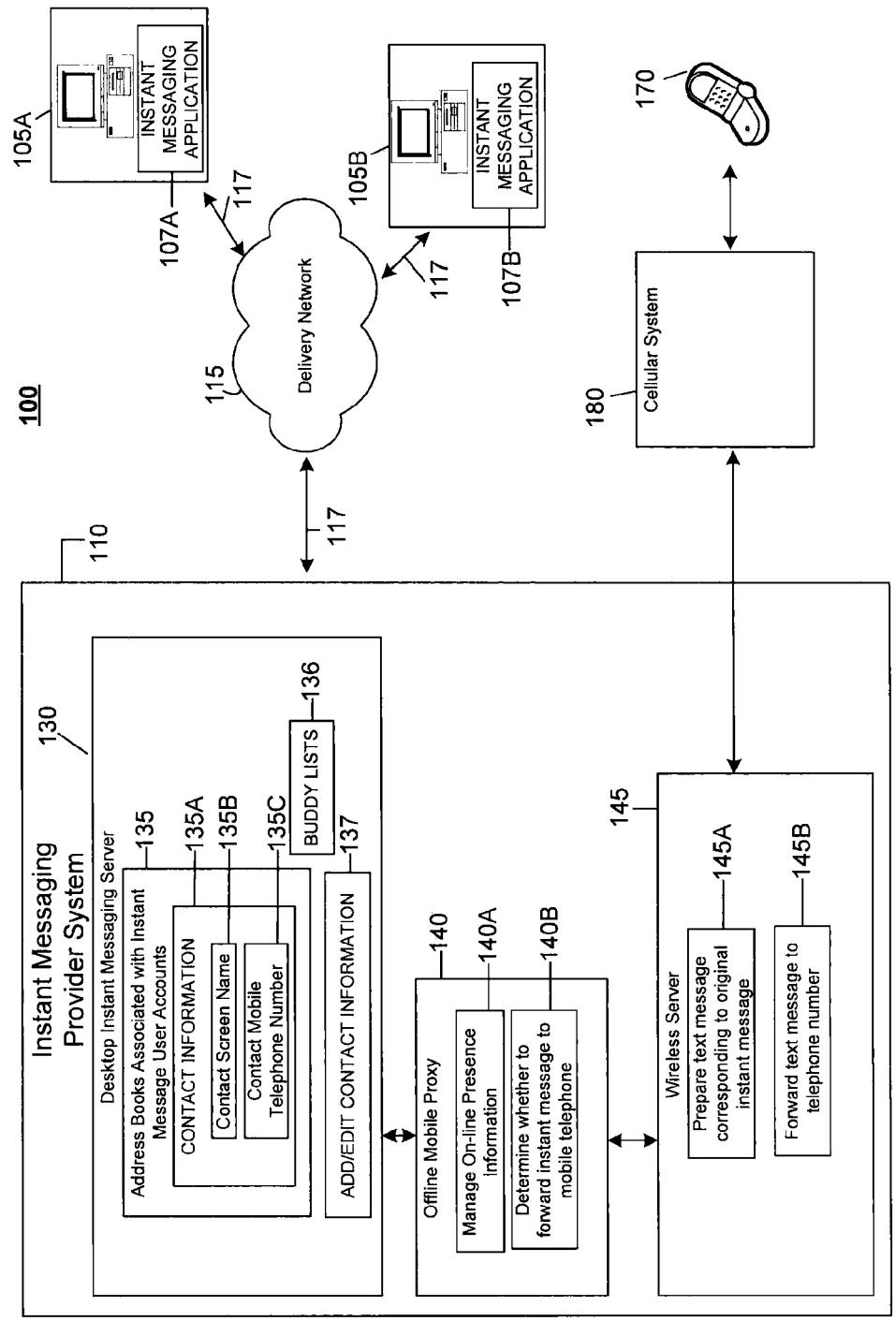
FIG. 1 is a block diagram of a communications system capable of forwarding instant messages based on contact information.

Techniques are described for forwarding an instant message addressed to an intended instant messaging recipient to the recipient's mobile telephone when the recipient's mobile telephone number is known to the instant message sender. In one example, an instant message is forwarded to the intended recipient's mobile telephone number when the instant message sender's contact information for the intended recipient includes an instant message address (e.g., a screen name or other type of instant message identifier) and a mobile telephone number, without dependence upon the intended recipient's presence on the instant message (IM) system or through actual login or registration with an IM forwarding service. In a more particular example, an address book of the instant message sender includes an entry for the intended recipient where the entry includes an instant message address and a mobile telephone number of the intended recipient.

More generally, an instant messaging user may maintain a list (a "buddy list") of user-selected potential instant messaging recipients ("buddies") to identify another instant messaging user with whom instant messages are to be exchanged. More specifically, with reference to one exemplary. implementation, a buddy list is a user-definable list of other co-users (i.e., buddies) of an online or network communications systems that enables the user to perceive presence information and changes for the co-users in a unique graphical user interface (GUI) and to track changes to presence status for the co-users in substantially real-time automatically, where presence indicates the status of the co-user with respect to the online or network communications system. The buddy list also provides the user with a mechanism to initiate communications (e.g., instant messages electronic mail (e-mail), chat, and other communications) with the co-users. When a user signed on to a system, the set of buddies included in the user's buddy list is presented to the communications system. The communications system attempts to match co-users currently signed on to the system with the entries on the user's buddy list. Any matches are displayed to the user. As co-users sign on or sign off, a user's buddy list is updated to reflect these changes. An indication also may be added to show that a co-user has recently or is currently in the process of signing on or signing off the system. In some implementations, a user identity (e.g., a user account) may have one or more buddy lists of co-users, either with intersecting or disjoint lists of users, and the user label these buddy lists according to the user's preferences or otherwise.

In another example, an instant message addressed to an intended instant messaging recipient is forwarded to the recipient's mobile telephone when the recipient is known to the instant message sender. The people that are presumed to be known by, or associated with, a user may be determined using a number of techniques, including, as discussed above, based on a determination that the recipient's mobile telephone number is known to the instant message sender. In another example, people within a certain number of degrees of separation from the user may be considered known to the user for purposes of this process. In yet another example, a user may be able to specify the people known to him manually, for example, by making changes to contact information or a white list that identifies users from whom communications are to be received. Alternatively, or additionally, the people known to a user may be inferred by monitoring the actions of the user. For example, people to whom the user sends an electronic mail (e-mail) message may be considered as known to the user. Likewise, saving or forwarding or printing an e-mail or instant message front a person may signal that the user knows that person.

More particularly, an instant message may be forwarded to the intended recipient's mobile telephone number when the recipient is determined to be among the people known to the sender. For example, a recipient may be determined to be among the people known to the sender by determining that the recipient is within a certain number of degrees of separation from the sender. Contact lists may be used to determine the links and degree of separation between the recipient and the sender. In one example, a sender may be presumed to know a recipient (and an instant message may be forwarded to the intended recipient's mobile telephone number) when the recipient's mobile telephone number is included in an entry of an address book of a user other than the sender, when contact information for the other user is included in the address book of the sender, even if the recipient's mobile telephone number is not included in the address book of the sender.

FIG. 1 shows a communications system 100 that is capable of delivering and exchanging messages between each of client systems 105A and 105B, and which includes an instant messaging provider system 110 and a network 115 used to facilitate exchange of such messages. The communications system 100 may be used to send and receive instant messages, and to forward a communication based on an instant message to a mobile telephone device 170 through a cellular system 180. Users of the communications system 100 are distributed geographically and communicate using client systems 105A and 105B. The client systems 105A and 105B are shown as including, respectively, instant message applications 107A and 107B. Network 115 interconnects the client systems 105A and 105B. The client systems 105A and 105B are connected to network 115 through various communication paths 117, such as a modem connected to a telephone line using, for example, serial line internet protocol (SLIP) or point-to-point protocol (PPP) or a direct network connection using, for example, transmission control protocol/internet protocol (TCP/IP). The instant messaging provider system 110 also is connected to the network 115 over communication pathway 117 and is used to facilitate some direct or indirect communications between the client systems 105A and 105B.

Each of the client systems 105A and 105B may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The client systems 105A and 105B may receive instructions from, for example, a software application, a program, a piece of code, a device, a computer, a computer system, or a combination thereof, which independently or collectively direct operations, as described herein. These instructions may take the form of one or more communications programs that facilitate communications between the users of client systems 105A and 105B. For instance, such communications programs may include e-mail programs, instant message programs, file transfer protocol (FTP) programs, and voice over internet protocol (VoIP) programs. The instructions may be embodied permanently or temporarily in any type of machine, component, equipment, storage medium, or propagated signal that is capable of being delivered to the client systems 105A and 105B.

The client systems 105A and 105B include a communications interface (not shown) used by the communications programs to send communications through network 115. The communications may include e-mail, audio data, video data, general binary data, or text data (e.g., encoded in American Standard Code for Information Interchange (ASCII) format). Client systems also include one or more input devices, such as a keyboard, a mouse, a stylus, or a microphone, as well as one or more output devices, such as a monitor, a touch screen, speakers, or a printer.

The network 115 typically includes a series of portals interconnected through a coherent system. Examples of the network 115 include the Internet, Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line of various types (DSL)), or any other wired or wireless network. The network 115 may include multiple networks or subnetworks, each of which may include, for example, a wired or wireless data pathway.

As with the client systems 105A and 105B, the instant message provider system 110 may be implemented using, for example, a general-purpose computer capable of responding to and executing instructions in a defined manner, a special-purpose computer, a workstation, a server, a device, a component, or other equipment or some combination thereof capable of responding to and executing instructions. The instant message provider system 110 may receive instructions from, for example, a software application, a program, a piece of code, a device, a computer, a computer system, or a combination thereof, which independently or collectively direct operations, as described herein. These instructions may take the form of one or more communications programs. Such communications programs may include, for example, e-mail programs, instant message programs, FTP programs, and VOW programs. The instructions may be embodied permanently or temporarily in any type of machine, component, equipment, storage medium, or propagated signal that is capable of being delivered to the instant message provider system 110.

Further, the instant message provider system 110 includes a communications interface (not shown) used by the communications programs to send communications through network 115. The communications may include e-mail, audio data, video data, general binary data, or text data (e.g., encoded in American Standard Code for Information Interchange (ASCII) format).

The instant message applications 107A and 107B include buddy lists that include communications identities ("buddies") with which instant messages are exchanged using the respective client systems 105A and 105B. More particularly, the instant message applications 107A and 10713 include a buddy list for each user that uses the client systems 105A and 105B to send and receive instant messages. The instant message applications 107A and 107B enable the users to send and receive instant messages with the client systems 105A and 105B. Instant messages are sent between users of the client systems 105A and 105B through a desktop instant message server 130 on the instant message provider system 110.

The provider system 110 includes a desktop instant messaging server 130 that operates instant messaging server software configured to process communications sent from and received by users of an instant messaging service. In particular, the desktop instant messaging server 130 is configured to exchange instant messages and communications related to the instant message service between the client systems 105A and 105B and the provider system 110 over the network 115. The desktop instant message server 130 initiates a point-to-point recipient, and/or it may be sent to route instant messages sent with the instant message applications 107A and 107B.

The desktop instant messaging server 110 also includes address books 135 that are associated with instant messaging user accounts (e.g., a screen name or other type of instant message identity identifier). More particularly, an address book is associated with a particular instant message identity (e.g., a sender) and includes contact information 135A for people that are significant to the instant message identity. The people listed in the contact information may be referred to as contacts. Each contact information entry in the address book may identify a screen name 135B (or other type of instant message address or identity identifier) and a mobile telephone number 135C for a contact of the instant message identity to whom the address book applies (e.g., sender). In some implementations, the address book may include additional information, such as a name, mailing address information, and other types of telephone numbers. Some implementations may refer to an address book by other terms, such as contact information or user information.

The desktop instant messaging server 110 also includes buddy lists 136 for instant messaging user accounts. Particular buddy lists may be used by instant messaging application 107A or 107B that are associated with an instant messaging user using the client system 105A or 105B, respectively.

The desktop instant messaging server 130 also includes code segments 137 to enable a user to manage contact information 135A in the user's address book, such as by adding information for a new contact, deleting a contact, or editing information related to a contact. The code segments 137 enable a user to identify a mobile telephone and an instant messaging identity identifier or account (e.g., screen name) for a contact An offline mobile proxy 140 represents the online presence and/or availability of a user of the instant messaging system when the user is offline, thus enabling communications to offline users via alternative communication schemes (e.g., text messaging to a text-capable telephone), even if an instant messaging service is configured to restrict messaging to users who reflect online presence. The offline mobile proxy 140 represents to the desktop instant messaging server 130 that a user is capable of receiving an instant message when a user is actually offline. Accordingly, when a user is offline, availability of the user to communicate may be perceived by others and messages sent to them may be received using an alternative communications scheme (e.g., text messaging to a text-capable telephone). For instance, a user who is not signed on to the instant message service (i.e., an offline user) and whose mobile telephone number is included in a potential sender's address book may be perceived as available to receive messages by the potential sender—that is the user who is offline remains listed as available for messaging on the buddy lists of users who subscribe to the user's online presence and have contact information for the user that includes the user's mobile telephone number and screen name. Moreover, an instant message intended for such an offline user is received by the desktop instant messaging server 130 and provided to the wireless server 145, which communicates a text message based on the original instant message to the mobile telephone device 170 associated with the offline user. The text message is communicated from the wireless server 145 to the mobile telephone device 170 thorough the cellular system 180. The communication of an instant message addressed to an instant message screen name to a mobile telephone as a text message may be referred to as sender-initiated mobile forwarding. Such sender-initiated mobile forwarding may be distinguished from recipient-initiated mobile forwarding in which a recipient configures, or otherwise enables, the recipient's own instant messaging account to forward an instant message as a text message to the recipient's mobile telephone. Sender-initiated mobile forwarding also may be referred to as sender-inspired mobile forwarding. Recipient-initiated also may be referred to as recipient-inspired mobile forwarding.

The offline mobile proxy 140 includes code segments 140A to manage online presence information. When the desktop instant messaging server 130 detects that a user has signed off the instant messaging service, the desktop instant messaging server 130 communicates the status of the user (e.g., offline) to the offline mobile proxy 140, which executes code segment 140A to indicate to the desktop instant messaging server 130 that the user is online. This enables a user to be perceived by the desktop instant messaging server 130 as online when the user is offline (e.g., not signed in to the instant messaging service). In one implementation, the offline mobile proxy 140 also executes code segment 140A to update, or enable the update of, the screen name associated with a user to show a mobile indicator adjacent to the user's screen name on each of the buddy lists that include the user's screen name. The mobile indicator indicates that the user is available at their mobile device to receive messages inspired through manipulation of the buddy list in the ordinary manner, indicates that the user is not signed on to the desktop instant messaging service, and also indicates that the user has invoked recipient-initiated mobile forwarding, as described more fully in FIG. 3.

The offline mobile proxy 140 also includes code segments 140B that may be executed by the offline mobile proxy 140 to determine whether to forward an instant message addressed to an offline intended recipient to the mobile telephone device 170 associated with the intended recipient of the original instant message. In one example, the offline mobile proxy 140 executing the code segments 140B may determine to forward an instant message when a sender of the instant message knows the potential recipient's mobile telephone number (i.e., the offline mobile proxy 140 directly, or thorough the desktop instant messaging server 130, determines there is an entry in address books 135 for contact information 135A that includes a mobile telephone number associated with the potential recipient's screen name. This may be referred to as determining whether to forward an instant message based on contact information. In another example, the offline mobile proxy 140 may determine to forward the instant message based on Contact information and other factors. For example, the offline mobile proxy 140 may determine whether to forward an instant message to a mobile telephone number based on a user state (e.g., only when a user is offline), based on a sender request (e.g., confirmation that the sender wants to send a message to the mobile telephone), or unconditionally (e.g., mirror all instant messages to the mobile telephone even when the user is signed on to the instant message service). Accordingly, the offline mobile proxy 140 executing the code segments 140B may determine to forward the instant message only when the user is offline or it instead may determine to forward the instant message only when the sender has indicated that the instant message should be forwarded. In yet another example, the offline mobile proxy 140 executing the code segments 140B may determine to forward the instant message when the sender has a mobile telephone number for the potential recipient and the potential recipient has not prohibited forwarding of instant messages to the potential recipient's mobile telephone. In any event, when the offline mobile proxy 140 determines that an instant message is to be forwarded to a mobile device, the offline mobile proxy 140 provides the instant message to the wireless server 145.

The wireless server 145 includes code segments 145A configured to prepare, based on an original instant message, a text message that is based on the short message service (SMS) protocol, which is particularly useful in sending and receiving short text messages to mobile devices, such as mobile telephones. The code segments 145A include addressing operations. In one example, the wireless server 145 executing code segments 145A may use contact information 135A in address books 135 to identify the mobile telephone number of the recipient identified in the instant message. To do so, the wireless server 145 executing code segments 145A may identify a contact entry in the address book of the sender of the instant message where the contact entry includes the screen name to whom the instant message is addressed and a mobile telephone number. The addressing operations also may include addressing the text message to the identified mobile telephone number. The addressing operations also may include converting the instant message to a different character set that is used by the text message. For example, an instant message may use an ASCII character set or a Unicode character set, whereas the text message may use a GSM ("Global System for Mobile Communications") character set. In such a case, the wireless server 145 executing code segments 145A also converts the instant message from the ASCII or Unicode character set to the GSM character set.

In addition, the wireless server 145 also includes code segments 145B configured to forward a text message to a telephone number. More particularly, the wireless server 145 executing code segments 145B forwards to the cellular system 180 a text message prepared by executing code segments 145A. This may be referred to as mobile forwarding. If mobile forwarding is inspired by the sender's contact information for the intended recipient, the mobile forwarding may be referred to as sender-initiated mobile forwarding. Similarly, if mobile forwarding is performed based on action by the recipient, then the mobile forwarding may be referred to as recipient-initiated mobile forwarding.

The mobile telephone device 170 is associated with a mobile telephone number to which telephone calls may be routed over the cellular system 180. The mobile telephone device 170 also may be associated with a SMS address that typically is the same as the mobile telephone number associated with the mobile telephone device 170, though this need not necessarily be so. The mobile telephone device 170 is capable of receiving, displaying, processing, and sending text messages over the cellular system 180. The mobile telephone device 170 also may be referred to as a text-capable telephone.

The cellular system 180 may include a cellular network that is capable of transmitting and receiving digital or analog signals using cellular technologies, including Advanced Mobile Telephone System (AMPS), Narrowband Advanced Mobile Telephone Service (NAMPS), Frequency Shift Keying (FSK), Frequency Division Multiple Access (FDMA), Time Division Multiple Access (TDMA), and Code Division Multiple Access (CDMA), or any standard, such as Global System for Mobile Communications (GSM) or Cellular Digital Packet Data (CDPD). Alternatively, the cellular system 180 may be any type of telephone network capable of transmitting text messages to any type of telephone or mobile device.

In general, the communications system 100 may be used to send an instant message sent from a client system 105A or 105B to the instant message provider system 110, which transforms the instant message to a corresponding text message that is muted over the cellular system 180 to the mobile telephone device 170. The original instant message is addressed to a screen name and forwarded to the mobile telephone device 170 based on the sender's contact information for the intended recipient—that is, based on an association, in the sender's contact information 135A of address books 135, of the screen name and the mobile telephone number of the intended recipient, and detection of offline stains of the screen name identity (i.e., the user of the mobile telephone device 170).

In some implementations, forwarding an instant message to a mobile telephone may be prohibited by the user of the mobile telephone, even when the sender of the instant message knows the mobile telephone number of the intended recipient of the instant message (e.g., contact information in the sender's address book includes a mobile telephone number associated with the screen name of the intended recipient). Additionally or alternatively, forwarding of an instant message to a mobile telephone may be performed only after confirmation is received from the sender of the instant message.

In some implementations, the client system 105A or 105B may be capable of performing some or all of the operations described as being performed by the instant message provider system 110.

Sender-initiated mobile forwarding may reduce burden on sender's of instant messages to alleviate, or minimize, effort of monitoring recipient availability to receive an instant message. It may be possible to monitor recipient availability to receive, on the recipient's mobile telephone, a communication based on an instant message For example, in some implementations, sender-initiated mobile forwarding may only occur when the intended recipient's mobile telephone is activated, within signal range, and able to receive a text message, though this need not necessarily be so. Text messaging to a mobile telephone may be implemented using store-and-forward techniques such that a text message that is sent to a deactivated (e.g., turned off) mobile telephone is delivered to the mobile telephone when the mobile telephone is activated (e.g., turned on) or becomes within receiving range of a mobile signal. In such a case, the recipient having mobile telephone may be identified as always being available to receive a text message.

In some implementations, a buddy list of potential instant messaging recipients may reflect whether one or more potential instant messaging recipients are available to receive a message forwarded to the potential recipient's mobile telephone. For example, when a potential recipient's mobile telephone is turned off, not within signal range, or is otherwise unable to receive a text message, the buddy list including the instant messaging recipient may reflect the potential recipient's unavailability to receive a message forwarded to the potential recipient's mobile telephone. A buddy list that indicates whether a potential recipient is available to receive a message forwarded to the potential recipient's mobile telephone may be applicable to sender-initiated mobile forwarding and may be applicable to recipient-controlled mobile forwarding.

Figure 2:
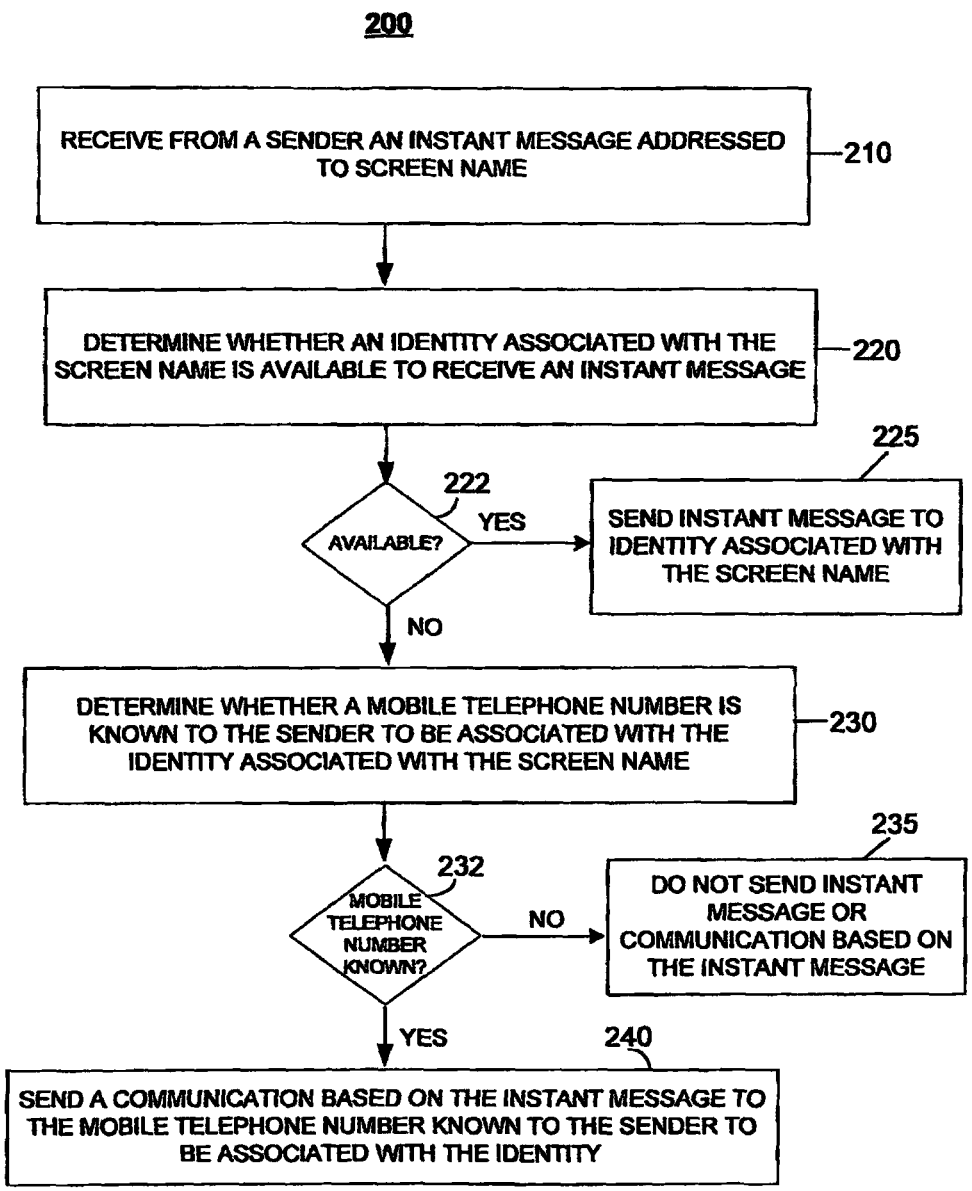
FIGS. 2 and 8 are flow charts of processes for forwarding an instant message based on contact information.

FIG. 2 illustrates a process 200 for forwarding an instant message, based on contact information for an intended recipient, to a mobile telephone device capable of receiving, processing, displaying and transmitting text messages. The process 200 may be performed, for example, by a processor on the provider system 110 of FIG. 1 or may be performed by an instant messaging application, such as instant messaging application 107A or 107B of FIG. 1. For convenience, the processor performing the process 200 may be referred to as an instant messaging system.

The process 200 begins when a user creates an instant message addressed to a screen name, and the instant message is received by the instant messaging system (step 210). The user, who may be referred to as a sender, may do so using an instant messaging application to identify a buddy from within their buddy list and enter text or other content for the instant message. Accordingly, the instant message is addressed to a screen name of an identity listed on the sender's buddy list. Alternatively, the screen name of the intended recipient of the instant message may be a identified by the user by entering a screen name (rather than selecting a buddy from the sender's buddy list).

The instant messaging system determines whether an identity associated with the screen name is available to receive an instant message (step 220). This may be accomplished, for example, by the instant messaging system checking whether the identity associated with the screen name is signed on to the instant message system. When the identity associated with the screen name is available to receive an instant message (step 222), the instant messaging system sends the instant message to the identity associated with the screen name (step 225). For example, the instant message system may forward the instant message to the client system, such as 105A or 105B of FIG. 1, used by the identity.

When the identity associated with the screen name is not available to receive an instant message (step 222), the instant messaging system determines whether a mobile telephone number is known by the sender to be associated with the identity associated with the screen name. In one example, the instant messaging system identifies a collection of contact information (i.e., an address book, a contact list, or a buddy list) that is associated with the sender of the instant message and searches the identified collection for an entry that includes a screen name that matches the screen name to which the instant message is addressed. If such a match found, the instant messaging system determines whether a mobile telephone number is included in the contact information entry, and, when so, the instant messaging system determines that a mobile telephone number is known to the sender to be associated with the identity associated with the screen name to which the instant message is addressed.

When the instant message system determines that a mobile telephone number is not known by the sender to be associated with the identity associated with the screen name (e.g., contact information for the identity is not included in the sender's address book or contact information for the identity is included in the sender's address book and the contact information does not include a mobile telephone number) (step 232), the instant message system does not send the instant message to the intended recipient and does not send a communication based on the instant message (e.g., does not forward a text message to a mobile telephone number) (step 235).

When the instant message system determines that a mobile telephone number is known by the sender to be associated with the identity associated with the screen name (e.g., contact information for the identity is included in the sender's address book, where the contact information includes a mobile telephone number and identifies a screen name) (step 232), the instant message system sends a communication based on the instant message to the mobile telephone number known to the sender to be associated with the identity (step 240). This may be accomplished, for example, by preparing and forwarding a text message based on the instant message to the mobile telephone number for the identity, directly or indirectly, thorough a cellular system, as described previously with respect to FIG. 1.

In some implementations, the determination as to whether a identity is available may include, when the identity is signed on to the instant message system, making a determination that the identity is available only when the identity is not idle (e.g., the identity has not interacted with the client system running the instant message application program in a predetermined or user-configurable amount of time). In such a case, a communication based on the instant message may be sent to a mobile telephone number known to the sender to be associated with the identity when the identity is not signed on and/or is idle. Alternatively or additionally, an instant message account or instant message application may be configured to identify conditions when sender-initiated mobile forwarding occurs—such as, only when a recipient is not signed on to the instant message application, or when a recipient is not signed on to the instant message application or is idle.

Referring to FIG. 3, a graphical user interface 300 displays a buddy list for an instant messaging identity (e.g., an instant message sender) where the buddy list identifies buddies for whom a mobile telephone number is known to the instant messaging identity (e.g., the instant message sender).

The graphical user interface 300 includes an instant message sender-selected list 310 of potential instant messaging recipients 320a-320g. The graphical user interface 300 may be referred to as an instant message buddy list window 300, an instant message buddy list interface 300, or, more simply, a buddy list window 300 or a buddy list interface 300, and the list 310 may be referred to as a buddy list 310. In some implementations, the buddy list also may be referred to as a participant list, a contact list or a friends list. Thus, buddies typically are contacts who are known to the potential instant message sender (here, IMSender). A buddy is identified by a screen name or other type of identity identifier, such as an account name, a user name, a user identity, or an alias of an identity identifier. In particular, the user IMSender is an instant message sender using the buddy list interface 300. The buddy list interface 300 is rendered on the display of a computing device or a communication device on which an instant messaging client program is executed, such as the client system 105A or 105B of FIG. 1.

In the buddy list 310, the representations 320a-320g include text identifying the screen names of the buddies included in buddy list 310; however, additional or alternative information may be used to represent, and be associated with, one or more of the buddies, such as an avatar or other type of graphical image, that is reduced in size and either still or animated. In one example, a buddy icon is a small, two-dimensional graphical image that may be used for self-expression by the associated buddy (e.g., used to express an interest of the buddy), and which may be a still or animated image or graphic. For example, the representation 320a includes the screen name 321a and corresponding buddy icon 322a of the instant message recipient named SuperBuddy-Fan1. The buddy icon typically selected by the party identified by the screen name, but it may be selected instead by the buddy list owner. For convenience, each of the representations 320a-320g may be referred to as a screen name 320a-

320g. In some implementations, one or more of the representations 320a-320g may be an alias of a screen name rather than a screen name itself. The representations 320a-320g may provide connectivity information to the instant message sender about the buddy, such as whether the buddy is online, how long the buddy has been online, whether the buddy is away from the client system executing the instant messaging client application, or whether the buddy is available through a mobile device.

Buddies may be grouped by an instant message sender into one or more user-defined or pre-selected groupings ("groups"). As shown, the instant message buddy list window 300 has three groups, Buddies 322, Co-Workers 324, and Family 326. SuperBuddyFan1 320a belongs to the Buddies group 322, and ChattingChuck 320c belongs to the Co-Workers group 324. When a buddy's instant message client program is able to receive communications, the representation of the buddy in the buddy list is displayed under the name or representation of the buddy group to which the buddy belongs. As shown, at least potential instant messaging recipients 320a-320g are online. In contrast, when a buddy's instant message client program is not able to receive communications, the representation of the buddy in the buddy list may not be displayed under the group with which it is associated, but it may instead be displayed with representations of buddies from other groups under the heading Offline 328, or it may otherwise be visually distinguished from other buddies who then have available/present instant message client programs. All buddies included in the buddy list 310 that are displayed in the messaging mode are displayed either under one of the groups 322, 324, or 326, or under the heading Offline 328.

The buddy list 310 also includes a mobile indicator 310A that reflects the existence of a mobile telephone number for the identity is known to the user (i.e., IMSender) and, as such, is a means for contacting the identity associated with the screen name 320b (i.e., Boss) adjacent to the mobile indicator 310A. Thus, the mobile indicator 310A may indicate that a message addressed to the screen name 320b is to be forwarded to a mobile telephone number associated with the screen name 320b based on an association of a mobile telephone number with the screen name 320b in the user's (i.e., IMSender) contact information. The mobile indicator 310A also may be referred to as a sender-initiated forwarding indicator. Generally, the mobile indicator 310A is displayed only when the identity associated with the screen name 320b is not available to receive an instant message (e.g., is offline and/or is idle), though this need not necessarily be so. In some implementations, the mobile indicator 310A may indicate only that a mobile telephone number is associated with the screen name and not provide an indication as to whether an instant message sent to the corresponding screen name is to be forwarded to the mobile telephone number.

The buddy list 310 also includes a mobile indicator 310B that reflects that the identity associated with the screen name 320e (i.e., Mom) adjacent to the mobile indicator 310B has enabled recipient-initiated mobile forwarding of instant messages to the identity's mobile telephone. In contrast to the sender-initiated forwarding indicator 310A, the mobile telephone number of the identity need not necessarily be known to the user (i.e., IMSender). Mobile indicator 310B may be referred to as a recipient-initiated forwarding indicator. Generally, the mobile indicator 310B is displayed only when the identity associated with the screen name 320e is not available to receive an instant message (e.g., is offline and/or is idle), though this need not necessarily be so. Although the recipient-initiated forwarding indicator 310B is shown with a different presentation style from the presentation style of the sender-initiated forwarding indicator 310A, some implementations may use the same presentation style for both types of mobile indicators.

A mobile blocking indicator 310C on the buddy list 310 reflects that the identity associated with the screen name 320g (i.e., Brother) prohibits forwarding of instant messages to the identity's mobile telephone, even though the mobile telephone number associated with the identity may be known to the user. Generally, though not necessarily, the mobile blocking indicator 310C is displayed only when the identity associated with the screen name 320g is not available to receive an instant message (e.g., is offline and/or is idle). Alternatively, in contrast to displaying a mobile indicator 310C, some implementations may simply use the presence of a user's screen name to indicate their availability (by mobile forwarding or otherwise) to receive messages, and the absence of mobile indicators 310A and 310B to indicate an otherwise potential recipient's lack of availability due to either of an absence of their mobile forwarding information/registration or their expressed reluctance to receive messages at their mobile device. For example, some implementations may not display a mobile indicator 310A adjacent to a screen name when the sender has the mobile telephone number for the identity, the identity is offline, and the identity prohibits mobile forwarding. In such a case, for example, the screen name of the user may simply appear under the Offline group 328, even though the sender has their mobile forwarding information.

The mobile blocking indicator 310C may be particularly useful when applied to the Offline group 328. In such a case, the mobile blocking indicator 310C would inform sender the identities who are available to receive instant messages sent as text messages to the identities' mobile telephone. For example, when a potential recipient's mobile telephone is turned off, not within signal range, or is otherwise unable to receive a text message, the buddy list may include a mobile blocking indicator 310C to reflect the potential recipient's unavailability to receive a message forwarded to the potential recipient's mobile telephone.

A determination to display the mobile blocking indicator 310C may be made when a determination is made that the identity associated with the screen name 320g (i.e., Brother) is offline and/or is idle. For example, when the identity signs off of the host system providing the instant messaging service, the host system may determine whether the identity prohibits forwarding of instant messages to the identity's mobile telephone. To do so, for example, the host system may check configuration information associated with the screen name 320g and make a determination based on the configuration information. When the host system determines that forwarding of instant messages is prohibited by the identity, the host system may make that determination available to the client system or may make available an updated buddy list that includes the mobile blocking indicator 310C. This may be accomplished, for example, by sending the updated buddy list, sending a message that indicates the identity associated with the screen name prohibits forwarding of instant messages, or otherwise pushing the buddy list or determination to the client system that displays the buddy list 310. In another example, the host system enables the client system to access the updated buddy list with the mobile blocking indicator 310C, the determination that a mobile blocking indicator 310C is appropriate, or otherwise enabling the client system to pull the updated buddy list or determination that a mobile block indicator 310C is appropriate from the host system. The buddy list window 300 also includes controls 330 that a user may use to initiate functions related to instant messaging. In particular, a setup control 332 allows for configuration of the currently displayed buddy list. Selecting the setup control 332 enables functionality including the addition and deletion of screen names, such as screen names 320a and 320b, and groups, such as groups 322 and 324, to the buddy list 310.

When an online screen name from the buddy list 310 has been selected, activating an instant messaging control 334 displays an interface for communicating with the account corresponding to the selected screen name. Activating the instant messaging control 334 without selecting an online screen name in the buddy list 310 causes the display of an interface for communicating and allows a user to identify a instant messaging user that is not on the user's buddy list.

An info control 336 displays contact information related to a screen name selected on the buddy list 310 when contact information is available about the buddy. Such information may include, for example, a mobile telephone number, a work telephone number, and a home telephone number. In some implementations, information other than contact information may be displayed, such as, for example, name, geographic location, interests and hobbies, and occupation of the buddy. The contact information may be entered by identity (i.e., buddy) and, optionally, the identity may control whether some or all such information is displayed to other users. Additionally or alternatively, the contact information for the buddy may be entered by the user (i.e., IMSender). The contact information may be displayed, for example, in a user interface 400 of FIG. 4.

FIG. 4 illustrates an example of an interface 400 for associating, in contact information, a mobile telephone number with a screen name. The interface 400 may be displayed, for example, in response to a user activating a control to associate telephone numbers with an instant message identity identified on a the user's buddy list.

The interface 400 identifies the screen name 410 of an identity (i.e., "Steve Clark") with whom telephone numbers 420 are to be associated. The interface 400 enables a user to enter a mobile telephone number 425 to be associated with the screen name 410, which serves to inform the instant messaging service that the mobile telephone number associated with the screen name 410 is known to the user.

The interface 400 also includes controls. A control 432 is operable to associate the entered mobile telephone number 425 with the identified screen name 410 and remove the interface 400 from display on a computing device or communication device operating the instant messaging application. In contrast, a control 434 is operable to remove the interface 400 from display without associating the entered mobile telephone number 425 with the identified screen name 410.

In some implementations, an instant messaging user may enter the user's own mobile telephone number in the interface 400 and, in doing so, make known the user's own mobile telephone number to other instant messaging users. Thus, in doing so, the user enables instant messages sent to the user from other instant messaging users to be forwarded to the user's mobile telephone number when the user is offline. This may be a convenient method for a user to enable mobile forwarding to the user's mobile telephone.

This or a similar interface may be used to display a mobile telephone number that is associated with a screen name and, hence, known to the user displaying the interface. For example, with reference to FIG. 3, when a screen name is selected on the buddy list 310, activation of the control 336 may cause the display of a interface the same as or similar to interface 400.

Figure 5:
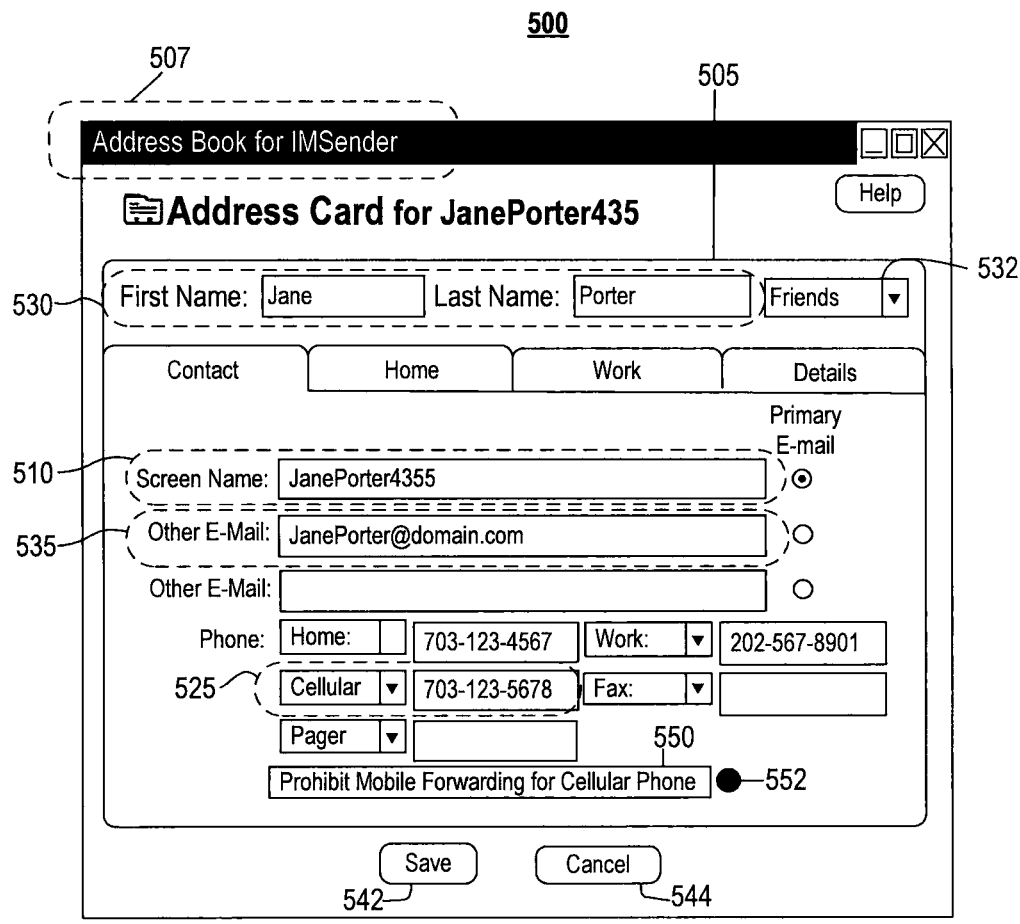

FIG. 5 depicts another example of an interface 500 for associating, in contact information, a mobile telephone number with a screen name, which serves to inform the instant messaging service that the mobile telephone number associated with the screen name is known to the particular user associated with the address book.

In contrast to the interface 400 of FIG. 4, the interface 500 presents an address card in an address book of an instant messaging user. More particularly, the interface 500 includes address card information 505 for a contact in an address book associated with the screen name of a particular instant messaging sender (i.e., IMSender) identified title bar 507. The address card information 505 includes a screen name 510 and a mobile telephone number 525 of the contact who is the subject of the address card. Thus, when a user enters and stores a screen name 510 and mobile telephone number 525 for the contact in the address card information 505, the instant messaging service is informed that the mobile telephone number 525 of the contact is known to the instant message sender (i.e., IMSender) with whom the address book is associated For example, with reference to FIG. 2., the existence of a mobile telephone number in a sender's general contact list may be used, at step 230, as the bases for determining the existence of mobile telephone number known by the sender to be associated with an identify associated with a screen name. Such a determination may be made even in the absence of a screen name in the contact list of the sender if the mobile telephone number of other general contact list is associated with some other indicia also linked to the recipient screen name in the buddy list or otherwise (e.g., name).

As illustrated, the address card information 505 also includes other types of information, such as the name of the contact 530, a category 532 of contacts with whom the contact is associated (i.e., a Friends category), and an e-mail account identifier 535 of e-mail account other than an e-mail account associated with the screen name 510.

The interface 500 also includes a control 542 to save address card information in electronic storage, such as address books 135 of FIG. 1 and remove the interface 500 from display, and a control 544 to remove the interface 500 from display without saving newly entered address card information.

In some implementations, the interface 500 also may include a control 550 operable to expressly prohibit sender-initiated mobile forwarding to the cellular phone number 525 associated with the screen name 510 (e.g., prohibit forwarding an instant message sent to the screen name 510 to the cellular phone number 525 when the identity associated with the screen name is not signed on to the instant messaging service) and an indicator 552 representing whether sender-initiated mobile forwarding to the cellular phone number 525 is prohibited. The ability for a user to control whether sender-initiated mobile forwarding is prohibited for a particular contact in the user's address book may be useful. For example, a user may store in the user's address book a cellular phone number for a contact for whom the user would not want to forward an instant message when the contact is offline. In one example, a user may wish to store a cellular phone number 525 for a contact where the contact owns a cellular phone corresponding to cellular phone number for emergency use only and customarily does not power on cellular phone. In such a case, the user may wish to prohibit sender-initiated mobile forwarding to the cellular phone. In some implementations, the control 550 may be operable to expressly prohibit both sender-initiated and recipient-initiated mobile forwarding (if the contact has configured the contact's instant message user account to enable recipient-initiated mobile forwarding).

In some implementations, other sender-configuration options may be provided. For example, a user may be able to select whether sender-initiated mobile forwarding based on contact information is enabled (or prohibited) for all contacts or contacts belonging to one or more contact categories. Similarly, a user may be able to select whether sender-initiated mobile forwarding based on contact information is enabled (or prohibited) as a default option for all contacts, or contacts belonging to one or more contact categories, unless overridden by user instruction. One example of such a user instruction is the control 550 operable to prohibit sender-initiated mobile forwarding to the mobile telephone number of the identified contact. Another example is the response of a user to a prompt inquiring whether the user wants to forward a particular instant message to a recipient, as described more fully later with respect to FIG. 6B.

Additionally or alternatively, recipient-configuration options may be provided for enabling a recipient to control whether an instant message is forwarded to the recipient's mobile telephone. For example, a user may configure the user's instant messaging account such that instant messages are not forwarded to the user's mobile telephone even when a sender has the user's mobile telephone number in the sender's contact information. More particularly, a user who is an intended recipient of an instant message may prohibit sender-initiated mobile forwarding from any sender, a particular sender and/or a sender that is associated with one of one or more buddy groups on the recipient's buddy list.

Figure 6A:
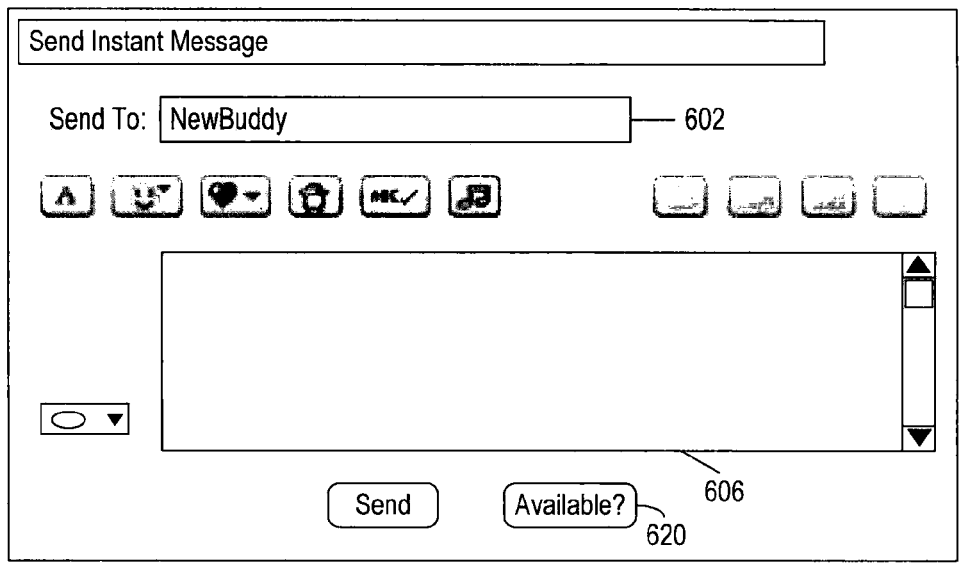
FIGS. 6A, 6B, 6C and 6D are illustrations of an exemplary interface for sending communications to a potential instant message recipient for whom a mobile telephone number is known to the instant messaging sender.

FIG. 6A shows an exemplary interface 600A for sending messages to a potential instant message recipient for whom a mobile telephone number is known to the instant messaging sender. More particularly, the interface 600A includes a recipient indicator 602 that indicates a screen name of a potential recipient of the messages sent with the interface 600A. The screen name of the potential recipient may be identified by selecting a screen name from a buddy list, such as buddy list 310 of FIG. 3, or may be entered by the user directly into the recipient indicator 602. As illustrated, the interface 600A is used to send communications to the screen name NewBuddy 602. In some implementations, the interface 600A also may include a sender indicator (not shown) that indicates a sender of the messages sent with the interface 600A.

The interface 600A includes a message compose text box 606 that enables text to be entered for a message and displays the text of a message to be sent from the sender and to the identified recipient 602. Once specified in the message compose text box 606, the message may be sent by selecting a send button 610. In some implementations, the interface 600A may include a message transcript text box (not shown) that displays the text of messages sent between the sender and the recipient.

Figure 6B:
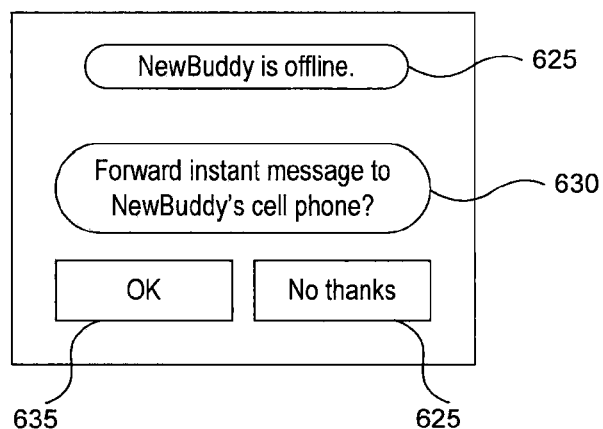

The interface 600A includes an available control 620 operable to display a user interface indicating whether the potential recipient is available to receive an instant message and, if not, to prompt the user to indicate whether the instant message is to be forwarded to the mobile phone number associated with the screen name (when a mobile telephone number is available for the screen name), such as user interface 600B of FIG. 6B.

FIG. 6B shows a user interface 6008 that may be presented to inform an instant message sender that the intended recipient of the instant message is not available to receive the instant message (e.g., the intended recipient is offline) and request confirmation from the instant message sender as to whether the instant message should be forwarded to a mobile telephone number associated with the intended recipient and known to the instant message sender.

More particularly, the interface 600B displays availability information 625 for the intended recipient As illustrated, the availability information 625 indicates that the intended recipient is offline. Another example of availability information 625 is information that the intended recipient is idle (e.g., has not interacted with the client system running the instant message application program in a predetermined or user-configurable amount of time). Yet another example of availability information 625 is information that the intended recipient is away from the client system running the instant message application program (e.g., that the intended recipient has set an away indicator to be displayed when an instant message is sent to the intended recipient). Availability information 625 also may provide notification that the intended recipient is offline and has enabled recipient-initiated mobile forwarding where a text message based on the instant message is to be sent to a mobile telephone number identified by the intended recipient.

The interface 600B also includes a prompt 630 for the user to indicate whether the instant message sender wishes to forward the instant message to the intended recipient's mobile telephone number. The prompt 630 may be displayed based on the association, in the instant message sender's collection of contact information (e.g., address book), of a mobile telephone number with the screen name of the intended recipient. In some implementations, the prompt 630 also may be displayed when intended recipient is offline and has enabled recipient-initiated mobile forwarding to receive a text message on the intended recipient's mobile telephone number.

A control 635 is operable to enable mobile forwarding of a text message to a mobile telephone number associated with the intended recipient and remove the interface 600B from display. In contrast, a control 637 is operable to remove the interface 600B without sending to a mobile telephone number associated with the intended recipient a text message based on the instant message.

Figure 6C:
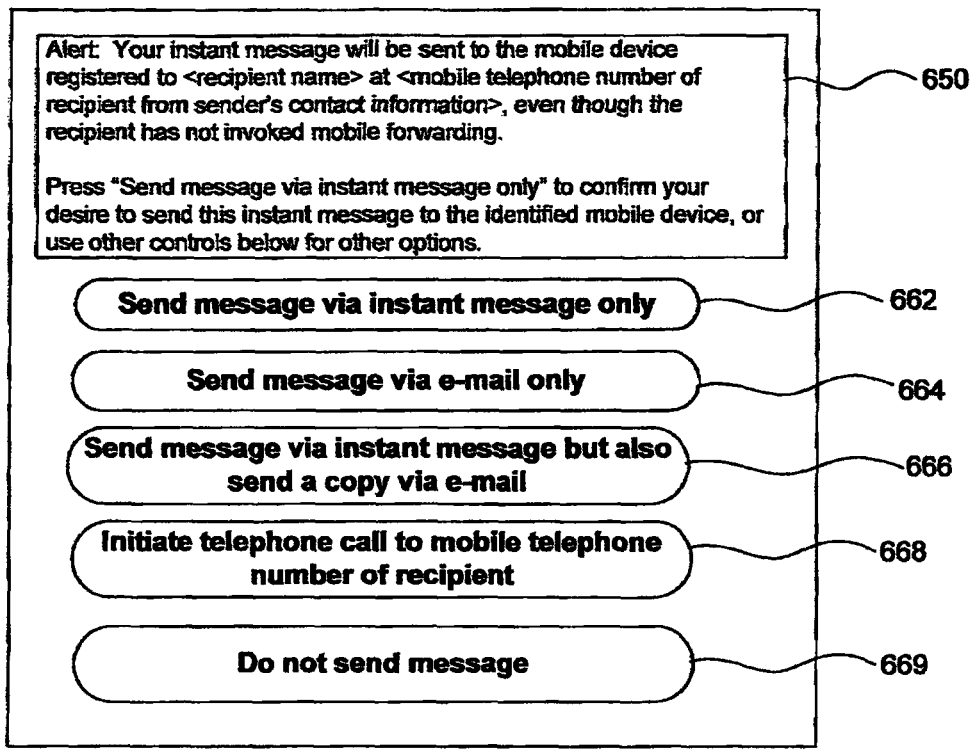

FIG. 6C shows another exemplary user interface 600C that may be presented to inform an instant message sender that the intended recipient of the instant message is not available to receive the instant message (e.g., the intended recipient is offline) and request confirmation from the instant message sender as to whether the instant message should be forwarded to a mobile telephone number associated with the intended recipient and known to the instant message sender. In contrast to FIG. 6B, the user interface 600C provides communication scheme options other than sender-initiated mobile forwarding to communicate with the intended recipient.

More particularly, the interface 600C includes a text box 650 informing the sender that the instant message is to be sent to the mobile device registered to the intended recipient and identifying the mobile telephone number to which the message is to be sent. The interface 600C also includes controls 662, 664, 666, 668 and 669 to identify the desired disposition of the message. In particular, the control 662 is operable to send the message content identified in the instant message via instant message only—that is, forwarding a text message to the mobile telephone number of the intended recipient and remove the interface 600C from the display. The control 662 is operable to send the message content identified in the instant message via instant message only—that is, forwarding a text message to the mobile telephone number of the intended recipient and remove the interface 600C from the display.

The control 664 is operable to send the message content identified in the instant message as an electronic mail (e-mail) message directed to an e-mail address associated with the intended recipient in the sender's contact information for the recipient, such as other e-mail address 535 of FIG. 5, and remove the interface 600C from the display.

Similarly, the control 666 is operable to send the message content both as a text message forwarded to a mobile telephone number of the recipient and as an e-mail message directed to the intended recipient, as well as to remove the interface 600C from the display.

The control 668 is operable to initiate a telephone call (e.g., a voice-based telephone call) to the mobile telephone number of the intended recipient and remove the interface 600C from the display.

The control 669 is operable to remove the interface 600C from the display without sending the instant message.

Figure 6D:
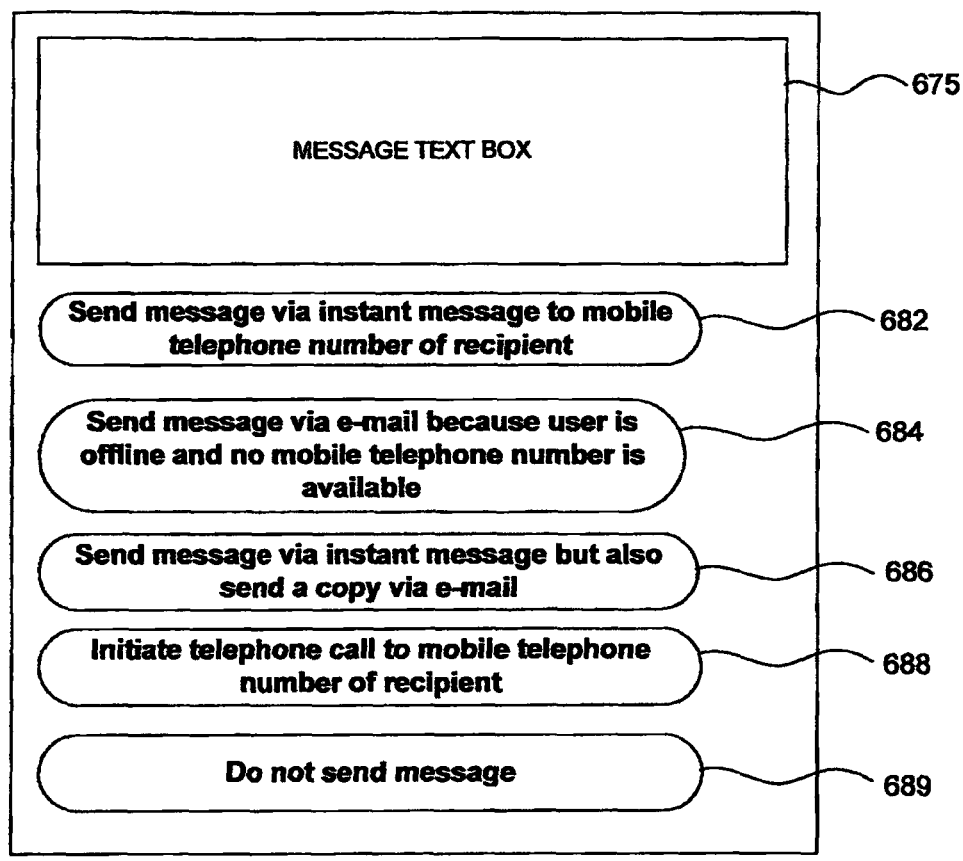

FIG. 6D shows yet another exemplary user interface 600D that may be presented to inform an instant message sender that the intended recipient of the instant message is not available to receive the instant message (e.g., the intended recipient is offline) and request confirmation from the instant message sender as to whether the instant message should be forwarded to a mobile telephone number associated with the intended recipient and known to the instant message sender. In contrast to FIG. 6C, the user interface 600D includes message content of the instant message in a message text box 675 that may be, for example, an implementation of message compose text box 606 of FIG. 6A.

Like the interface 600C of FIG. 6C, the interface 600D controls 682, 684, 686, 688 and 689, which may be implementations of controls 662, 664, 666, 668 and 669 of FIG. 6C, respectively.

Figure 7:
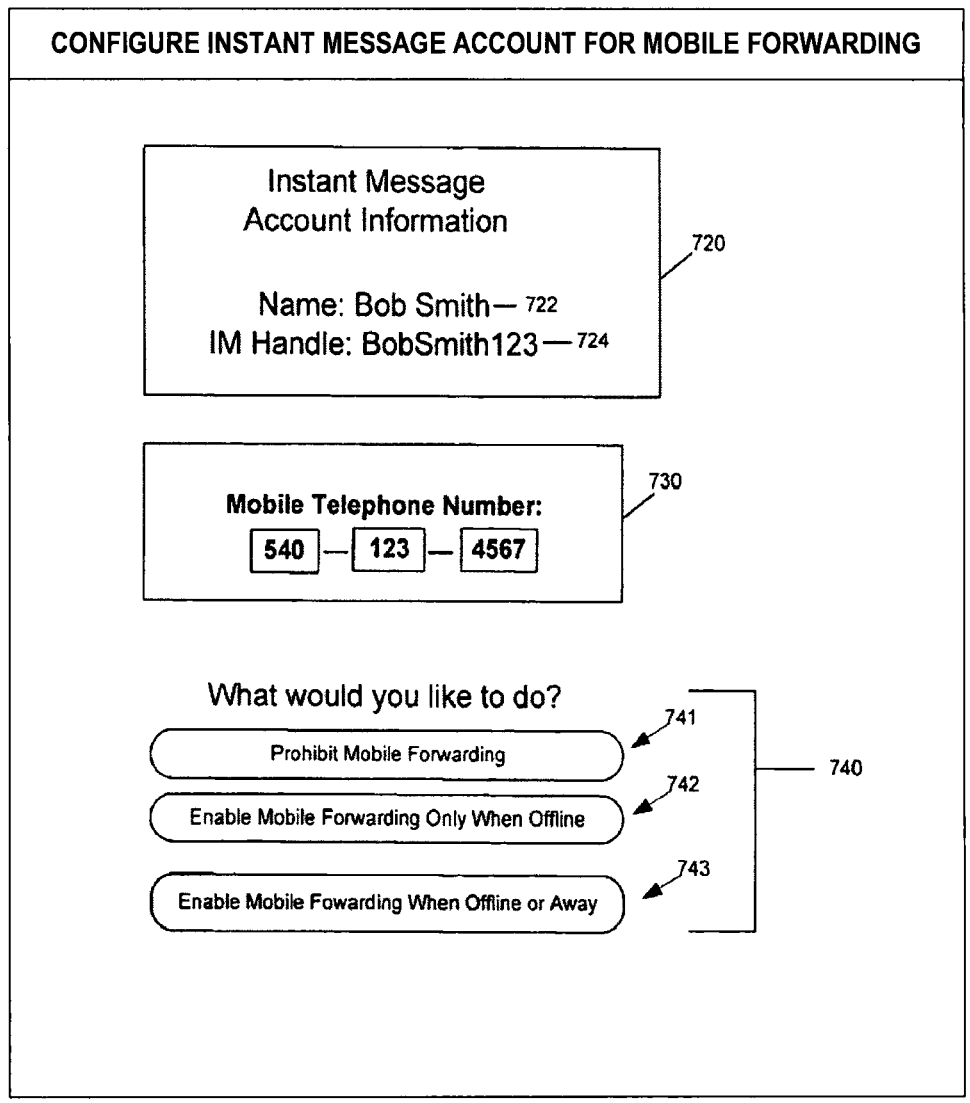
FIG. 7 is an illustration of an exemplary user interface for enabling an instant message identity to prohibit mobile forwarding to the identity's mobile telephone.

Referring to FIG. 7, an exemplary user interface 700 may be presented to a user upon initiation of a process to configure the user's instant messaging account to sender-initiated prohibit mobile forwarding. The user interface 700 includes profile information 720 for the instant messaging account being configured. The profile information 720 includes the name 722 of the identity (i.e., "Bob Smith") and the IM handle or screen name 724 of the identity (i.e., "BobSmith123"). The user interface 700 also includes the mobile telephone number 730 to which the configuration is to apply. In some implementations, the mobile telephone number 730 may be included in the profile information 720.

The user interface 700 also includes a set of option buttons 740 that may be selected by the user to configure user's instant messaging account to react to requests by a sender to forward messages to the mobile telephone number 730 based on the user's mobile telephone number in the sender's contact information for the user. The option buttons 740 may include, for example, an option button 741 to prohibit sender-initiated mobile forwarding (e.g., messages are not to be forwarded to the mobile telephone number when the user is not signed on to the instant messaging system), an option button 742 to enable sender-initiated mobile forwarding only when the user is offline, and an option button 743 to enable sender-initiated mobile forwarding when the user is offline or when the user is signed on and away (e.g., the user is signed on to the instant messaging account and an away message is enabled for the account to provide an indication to potential message senders that the user is not available to receive a message).

The user interface 700 allows sender-initiated mobile forwarding of instant messages to a user's mobile telephone number to be controlled according to recipient preferences. Thus, when a user configures the user's instant message account to prohibit sender-initiated mobile forwarding, the host system does not send a communication to the user's mobile telephone number even when the sender has the user's mobile telephone number and the user is not available. In some implementations, the user's mobile telephone number 730 is informational only such, when option 741 is selected to prohibit mobile forwarding, that the absence of the user's mobile telephone number 730 enables sender-initiated mobile forwarding only when the user is offline.

In some implementations, the interface 700 also may include an indication as to the configuration of the user's account—e.g., whether sender-initiated mobile forwarding is prohibited, is enabled only when the user is offline, or is enabled when the user is offline or away.

Figure 8:
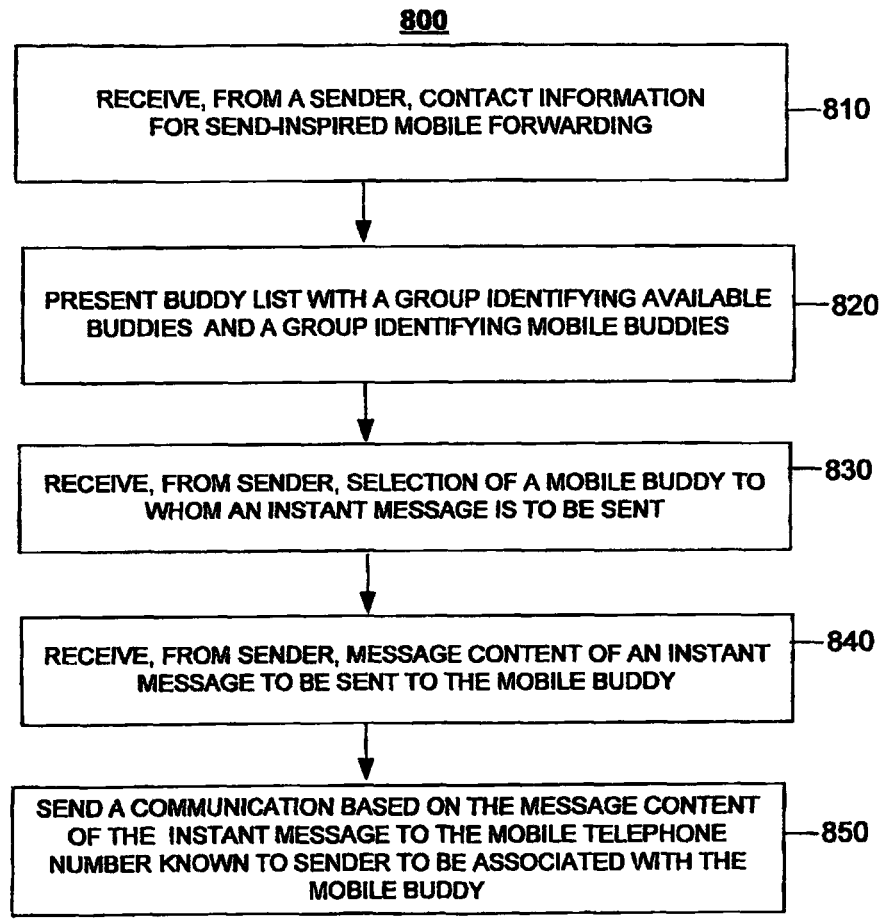

FIG. 8 shows a process 800 for forwarding an instant message, based on contact information for an intended recipient, to a mobile telephone device capable of receiving, processing, displaying and transmitting text messages. Like the process 200 of FIG. 2, the process 800 may be performed, for example, by a processor on the provider system 110 of FIG. 1 or may be performed by an instant messaging application, such as instant messaging application 107A or 107B of FIG. 1. For convenience, the processor performing the process 800 may be referred to as an instant messaging system.

The process 800 begins when a user identifies contact information for one or more instant message users, which is received by the instant messaging system (step 810). The user, who may be referred to as a sender, may do so using the interface 500 of FIG. 5 to enter an address card in an address book.

The instant messaging system presents a buddy list with a group of buddies that identifies available buddies and a group of buddies that identifies mobile buddies who are not available but for whom a mobile telephone number is known by the sender (e.g., the mobile telephone number has been entered in the sender's address book) (step 820). This may be accomplished, for example, by the instant messaging system checking whether an identity associated with each screen name on the buddy list is signed on to the instant message system and whether a mobile telephone number is known to the sender for each identity. When the identity is signed on, the identity is grouped in the available group, whereas when the identity is not signed on but a mobile telephone number is known to the sender, the identity is associated with the mobile buddies group. In some implementations, the buddy list may also present a group of buddies that are offline and for whom a mobile telephone number is not known by the sender.

In some implementations, a user may have the option of configuring a buddy list to include a buddy group that includes identities who are able to receive instant messages forwarded to a mobile device. Such a group may be referred to as a mobile buddy group or mobile buddies. For example, a user may be able to set a preference for including an identity who is able to receive instant messages forwarded to a mobile device in a mobile buddy group or, conversely, maintaining such an identity's integration within other known buddy groups. In another example, a user may be able to configure a buddy list to include such an identity both in a mobile buddy group and another buddy group. The instant messaging system receives, from the sender, a selection of a mobile buddy to whom an instant message is to be sent (step 830). For example, the sender may select a buddy from the buddy as described previously with respect to FIG. 3.

The instant message system received, from the sender, message content of an instant message to be sent to the identified mobile buddy (step 840). For example, the sender may identify text in the message compose text box 606 of FIG. 6.

The instant message system sends a communication based on the instant message to the mobile telephone number known to the sender to be associated with the identity (step 850). This may be accomplished, for example, by preparing and forwarding a text message based on the instant message to the mobile telephone number for the identity, directly or indirectly, thorough a cellular system, as described previously with respect to FIGS. 1 and 2.

Turning now to a fuller description, an instant message that is addressed to the recipient is forwarded to an intended instant messaging recipient's mobile telephone conditioned on whether the recipient is known to the instant message sender. In general, a recipient may be known to the sender even when the sender does not store, in the sender's address book or otherwise, a mobile telephone number for the recipient. Moreover, the sender and recipient may not have a direct relationship to another, but may nevertheless be linked to one another through intermediate identities based on a personal, business or other relationship among the identities and the intermediary identities. For example, a user A may have a friend, user B, who also uses the instant messaging service and who has a friend, user C, who also uses the instant messaging service. Thus, user A is linked to user C through user B, and as a consequence, may be deemed to know user C. Such interpersonal interactions or relationships may generally be referred to as a social network. How many intermediary identities are needed to link one identity with another identity may be referred to as the degree of separation between those two identities.

Contact lists (e.g., address books or buddy lists of instant messaging services) may be used to determine the links and degree of separation between a sender and a recipient.

For example, an identity A may list identity B in identity A's address book, identity B may list identity C in identity B's address book, and identity C may list identity D in identity C's address book. Here, identity D is linked to identity A by two degrees of separation (with identity B as the first degree and identity C as the second degree). Identity A is related to identity C by one degree of separation (identity B), and identity B is separated from identity D by one degree of separation (identity C). Identities A and B, identities B and C, and identities C and D are each respectively separated by zero degrees of separation.

Thus, a system may identify a first identity's social network (e.g., the entire social network or a portion of the social network up to a designated number of degrees of separation) by evaluating the first identity's contact list(s), evaluating the contact lists) of those identities listed in the first identity's contact list, and so forth until the desired number of degrees have been reached or the entire social network has been identified. For example, an identity A may list identities B and C in identity's A address book. The system may evaluate and determine that identities B and C are so listed and construct a social network map (which may be visually displayed and/or stored for later use) that indicates that identities B and C are linked to identity A. The system may then evaluate identity B's address book and identity C's address book to determine additional identities with whom identity B or identity C are linked. For example, the system may evaluate identity B's address book and determine that identities D and E are listed therein and, consequently, that identity B is linked to identities D and E. The system then may refine the social network to indicate that identity A is linked directly to identities B and C and is also linked to identities D and E through identity B.

Figure 9:
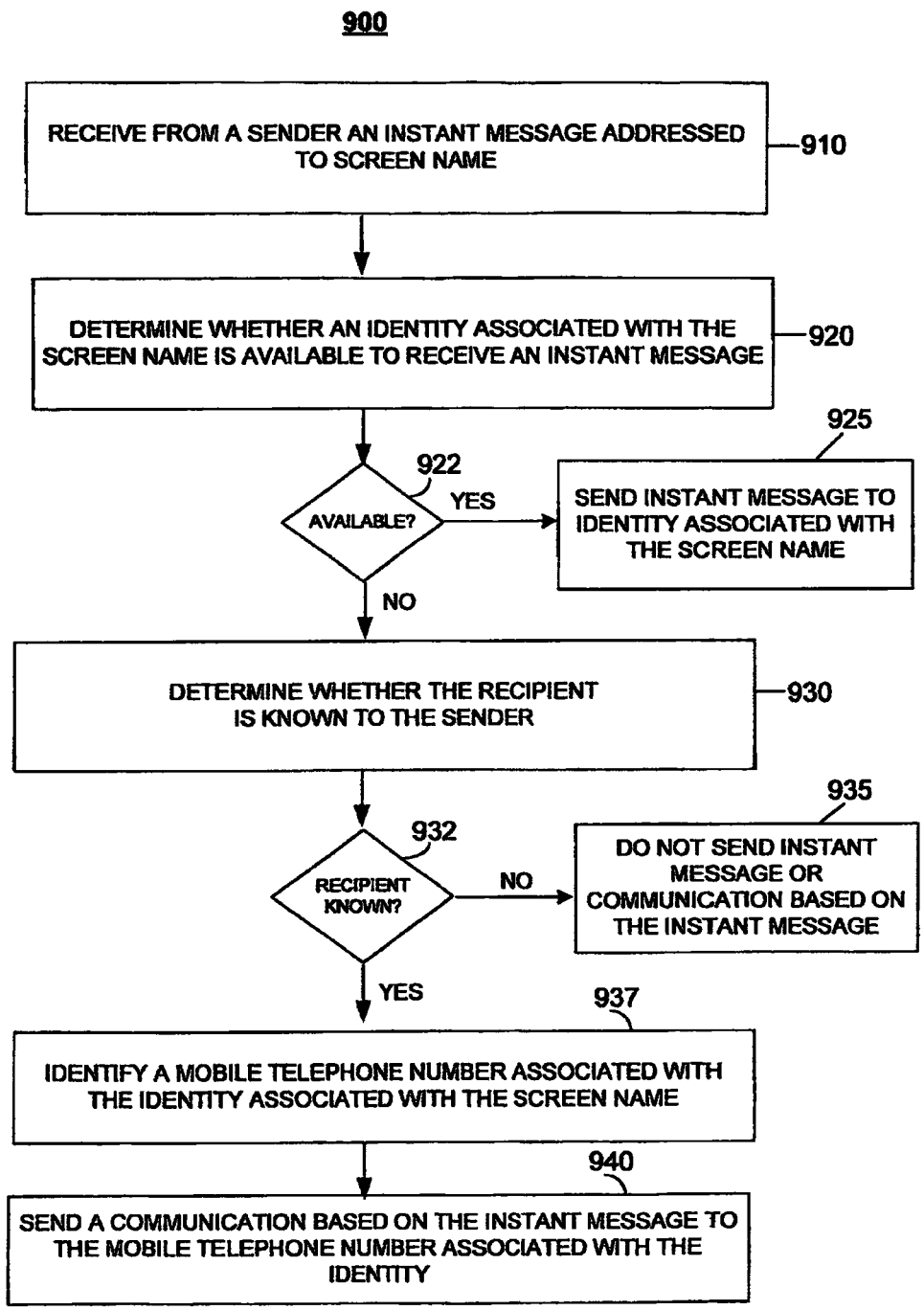
FIG. 9 is a flow chart of a process for forwarding an instant message only to people a sender is determined to know.

FIG. 9 illustrates a process 900 for forwarding an instant message, based on an intended recipient being known to the sender, to a mobile telephone device capable of receiving, processing, displaying and transmitting text messages. In contrast to the process 200 of FIG. 2, the process 900 forwards an instant message based on a mobile telephone number associated with the intended recipient that is not necessarily included in the sender's contact information for the intended recipient The process 900 may be performed, for example, by a processor on the provider system 110 of FIG. 1 or may be performed by an instant messaging application, such as instant messaging application 107A or 107B of FIG. 1. For convenience, the processor performing the process 900 may be referred to as an instant messaging system.

The process 900 begins when a user creates an instant message that is addressed to a screen name, and the instant message is received by the instant messaging system (step 910). The user, who may be referred to as a sender, may do so using an instant messaging application to identify a screen name of an intended recipient and enter text or other content for the instant message. Accordingly, the instant message is addressed to a screen name of an identity identified by the sender.

The instant messaging system determines whether an identity associated with the screen name is available to receive an instant message (step 920). This may be accomplished, for example, by the instant messaging system checking whether the identity associated with the screen name is signed on to the instant message system. When the identity associated with the screen name is available to receive an instant message (step 922), the instant messaging system sends the instant message to the identity associated with the screen name (step 925). For example, the instant message system may forward the instant message to the client system, such as 105A or 105B of FIG. 1, used by the identity.

When the identity associated with the screen name is not available to receive an instant message (step 922), the instant messaging system determines whether the recipient is known by the sender (step 930). In one example, the instant messaging system identifies a collection of contact information (i.e., an address book, a contact list, or a buddy list) that is associated with the sender of the instant message and searches the identified collection for an entry that includes a screen name that matches the screen name to which the instant message is addressed. If a match is not found, the instant messaging system searches collections of contact information of identities that are included in the sender's social network map for an entry that includes a screen name that matches the screen name to which the instant message is addressed. If a match is found, the instant messaging system determines that the recipient is known to the sender.

If the recipient is not known to the sender (step 932), the instant message system does not send the instant message to the intended recipient and does not send a communication based on the instant message (e.g., does not forward a text message to a mobile telephone number) (step 935).

If the recipient is known to the sender (step 932), the instant message system identifies a mobile telephone number associated with the identity associated with the screen name to which the instant message is addressed (step 937). To do so, for example, the instant message system searches for, and identifies, collections of contact information associated with identities who are included in the sender's social network map. In another example, the instant message system may search for the mobile telephone number of the identity associated in user contact or account information that is not necessarily associated with a particular identity (e.g., is not an address book or buddy list of a user of the instant message system).

The instant message system sends a communication based on the instant message to the mobile telephone number associated with the recipient (step 940). This may be accomplished, for example, by preparing and forwarding a text message based on the instant message to the mobile telephone number for the identity, directly or indirectly, thorough a cellular system, as described previously with respect to FIG. 1.

Figure 10:
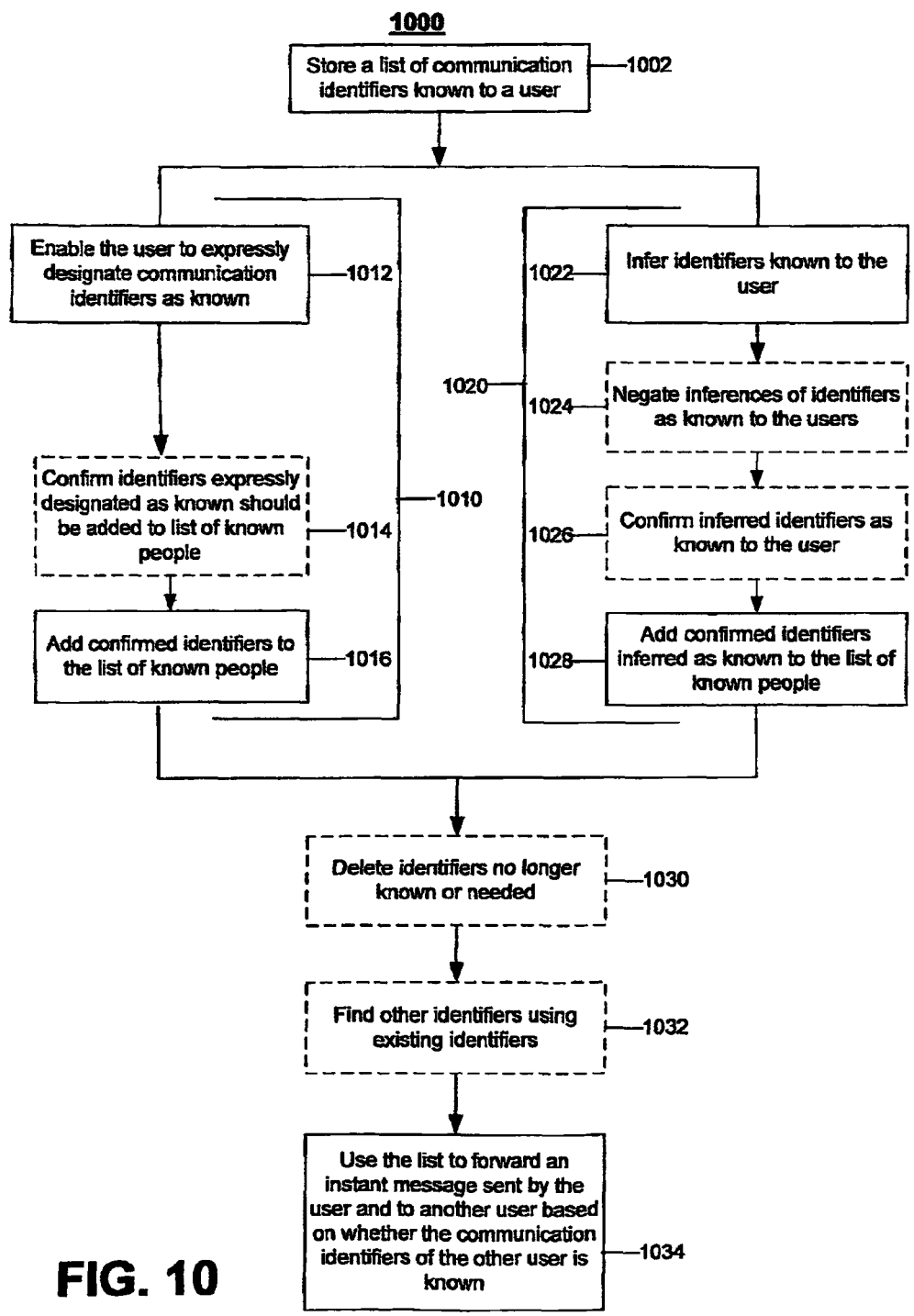
FIG. 10 is a flow chart of a process for maintaining and using a list of known people to forward instant messages only to known people.

Referring to FIG. 10, a process 1000 is used to maintain and use the list of people known to a met A list of people known to a user is stored (step 1002). Communication identifiers are stored in the list to indicate the known people.

The user can make manual additions to the list of known people (branch 1010). To that end, the user is made able to expressly designate communication identifiers as known (step 1012). For example, a graphical user interface (GUI) that allows the user to enter communication identifiers may be provided. There may also be a speech-based interface that allows the user to add communications identifiers to the list of known people by saying them. These interfaces may allow the user to augment the list of known people indirectly by allowing them to make additions to a contact list such as, for example, a custom sender list, an address book, or a buddy list.

However, the user may want to manually add a person to a contact list but not to the list of known people. An interface optionally may be presented to enable the user to confirm that the manually entered communication identifiers should be added to the list of known people (step 1014). The confirmation may be enabled by way of a GUI that allows the user to select the entered communication identifiers that the user actually wants to be included in the list of known people. This confirmation may occur after a predetermined number of communication identifiers have been entered, or at login or logoff to seek confirmation of any people entered during the previous online session. Those identifiers that the user confirms then are added to the list (step 1016). When a confirmation interface is not presented, all entered communication identifiers are added to the list of known people. Alternatively, there may be an interface that allows the user to directly enter identifiers into the list of known people.

On the other hand, communication identifiers may be inferred as being known based on the actions of the user (branch 1020). First, the communication identifiers known to the user are inferred (step 1022). For example, a communication identifier may be inferred as known if an e-mail message to that communication identifier is sent. When an instant messaging program is used, the communication identifier of the person with whom the user is communicating may be designated as known to the user.

One user's knowledge of another or their corresponding identifiers may be inferred based on user interactions with a received message. For example, a communication identifier also may be inferred as known if a message from that communication identifier is read, replied to, forwarded, saved, or printed. Likewise, the communication identifier that sent the e-mail message may be designated as known if the message is moved from the "inbox" to a folder that is not marked for deletion or for spam, or if the message is left open for a predetermined amount of time.

Known communication identifiers also may be inferred based on indicia other than user actions. As an example, the people designated as known to the people the user knows may be designated as being "known" to the user. For instance, if a person B is designated as someone user A knows, then the people designated as known to person B also may be designated as "known" to user A. One way this may be implemented is, for example, to designate the people in an address book and/or buddy list of person B as known to user A.

When inferring known people, some actions may be taken into account to negate an inference that the person is known (step 1024). For instance, if an e-mail received from a person is forwarded to an e-mail address that has been designated for reporting spam, then the inference that the user knows the person may be negated. As another example, an inference that a person is known may be negated if the person is included on an explicit black list of people with which communication should not occur, created by the user or the network administrator.

After known communication identifiers are inferred, an interface optionally may be presented to enable the user to confirm that the inferred communication identifiers are in fact known (step 1026). The confirmation may be enabled by way of a GUI that allows the user to select inferred communication identifiers that the user actually knows or wants to be included in the list of known people. This confirmation may occur after a predetermined number of communication identifiers have been inferred as known, or at login or logoff to seek confirmation of any people identified in the previous online session. Those identifiers that the user confirms then are added to the list (step 1028). When a confirmation interface is not presented, the inferred identifiers are added to the list.

Branches 1010 and 1020 may occur simultaneously or sequentially. After at least one of the branches has occurred, the user optionally may view the list of known people, and he or she may delete those users that are no longer known or needed (step 1030). In addition, communication identifiers in the list of known people can be used optionally to find other communication identifiers for that person (step 1032). For example, a person's e-mail address may be obtained from a profile associated with a screen name. Similarly, if the e-mail address is known, it may be used to obtain the screen name. The screen name, e-mail, or other determined communication identifiers may be used to determine other ways in which the known person may communicate with the user or in which the user may communicate with the known person.

Figure 11:
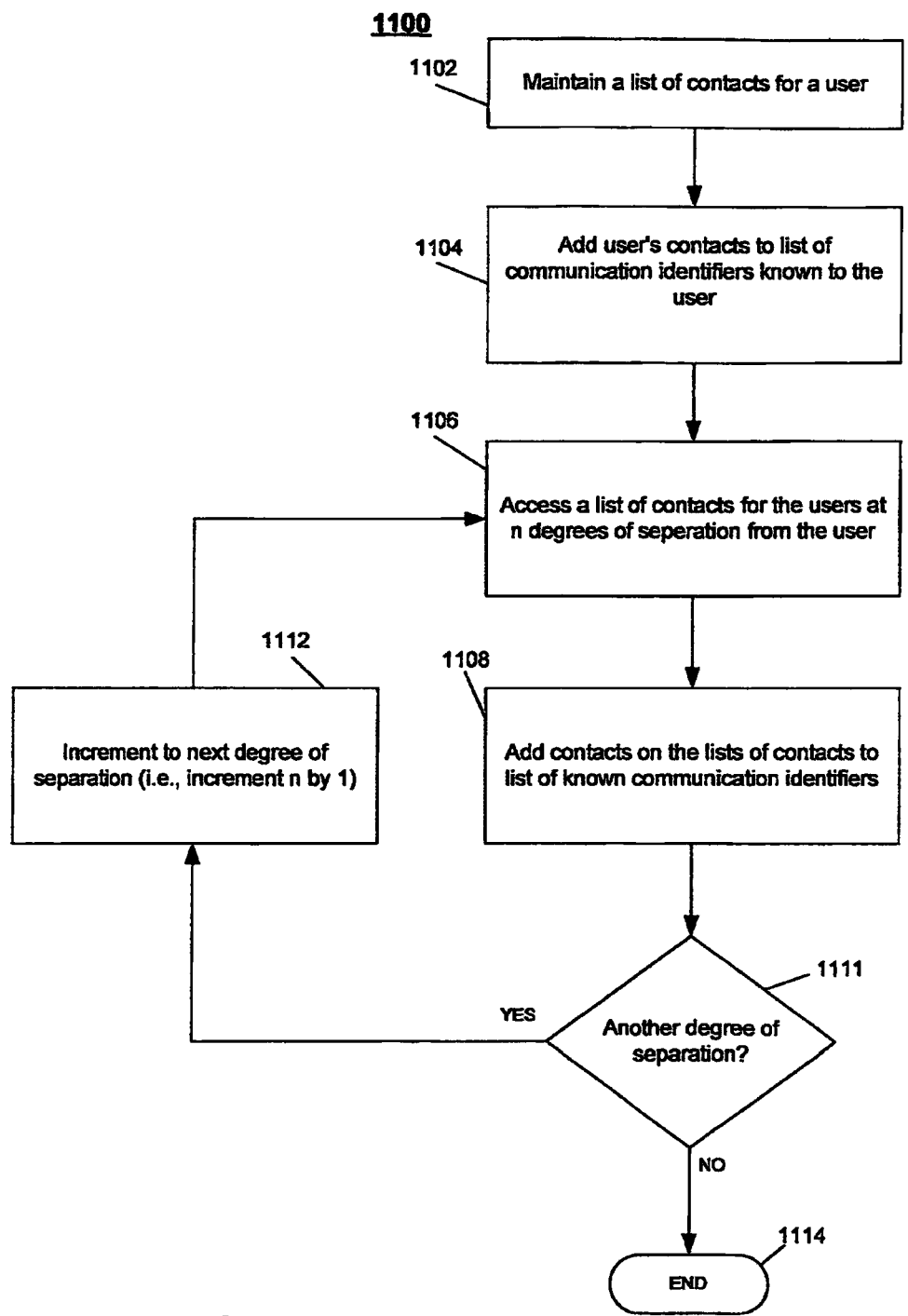
FIG. 11 is a flow chart of a process for inferring contacts of other users as known.

At this point, the list can be used to forward an instant message sent by the user to another user based on whether the communication identifiers of the other user is known (step 1034). For example, the list can be used to determine whether the intended recipient of an instant message is known to a sender. If so, a mobile telephone number associated with the intended recipient may be identified, for example, by using contact information associated with other known users or by using a collection of contact information maintained by the instant messaging system (e.g., a user profile or user account information). The instant message may be forwarded to the intended recipient Referring to FIG. 11, a process 1100 may be used to infer people within a certain number of degrees of separation from the user as known to the user. The degree of separation between two entities describes a relationship between those entities. Typically, the characteristics of user contact lists (e.g., address book, buddy list, and/or white list that identifies users from whom communications are to be received) are evaluated to determine the number of degrees (or hops) that are required to link or relate two users.

For example, recipient A may list user B in recipient A's address book, user B may list user C in user B's address book, and user C may list sender D in user C's address book Here, sender D is linked to recipient A by two degrees of separation (with user B as the first degree and user C as the second degree). Recipient A is related to user C by one degree of separation (user B) and user B is separated from sender D by one degree of separation (user C). Recipient A and user B, users B and C, and user C and sender D are each respectively separated by zero degrees of separation.

A list of contacts is maintained for the user (step 1102). The list of contacts may be any personally maintained list or lists, for example, an address book, a buddy list for instant messaging, and/or a white list The zest of process 1100 will be described using an address book as an example of a list of contacts. The contacts in the user's address book are added to the user's list of known people (step 1104).

Next, the contacts linked to the user (i.e., up to a desired degree of separation) are identified and added to the user's list of known people. To do so, the address books of each contact in the user's address book are accessed (step 1106). These address books are not normally configured for direct accessed by the user. That is, the user does not normally have access to other user's address books such as the address books of the contacts in the user's address book (the user's address book is configured for direct access by the user). The other users' address books typically include communication identifiers selected by the other users.

The contacts in the user's contacts' address books (i.e., the contacts separated by one degree) then are added to the list of known people (step 1108). If another degree of separation is desired (1110), the degree of separation is incremented (step 1112) such that the address books of the contacts that are separated from the user by one degree are accessed (step 1106) and the contacts in those address books are added to the list of known people list (step 1108). When a contact is added to the list of known people list, the contact's degree of separation from the user also may be added. The addition of contacts continues until the desired degree of separation is reached (step 1110). Once the desired degree of separation has been reached, all of the contacts within that desired degree of separation from the user have been inferred as known to the user (step 1114).

The desired degrees of separation may be a system parameter or, in some implementations, the user may be provided the user with the ability to set the desired degrees of separation. For example, the user may be provided with an interface that allows the user to decide whether degrees of separation will be used, and, if so, how many degrees should be used. Alternatively, the desired degrees of separation may be both a system parameter and able to be set by the user. For example, the system may include a default degrees of separation, which can be adjusted by the user if he or she so desires.

Process 1100 may result in the list of known people not being updated when any users related to the intended user update their contact lists. That is, if a user related to the intended user adds a contact to the user's contact list, the new contact may not be reflected in the intended user's list of known people. This situation may not be overly detrimental, particularly in implementations where the list of known people is used as a white list to exempt certain e-mails from spam filtering. However, repeating process 1100 on a periodic or a periodic basis may mitigate this situation. Another manner of mitigating this situation is to use an update system in which changes to contact lists are tracked and lists of known people are updated accordingly in an incremental fashion or by triggering an update or re-initiation of process 1100 when an update occurs.

The techniques described related to mobile forwarding based on contact information may provide a convenient method to automatically provide mobile forwarding without requiring the text message recipient to set up or otherwise configure the recipient's instant message account to enable such mobile forwarding. This may be useful, particularly when a user may be reluctant to so enable the user's account, perhaps, on the assumption that such a configuration process is or may be complex or confusing (regardless of whether such a configuration process is complex or confusing).

Although the techniques and concepts often are described above in terms of SMS text messaging, the techniques and concepts may be applied to other types of messages, such as a Multimedia Messaging Services (MMS) message, a video message and an audio message. Similarly, the techniques and concepts have been describe in terms of receiving an instant message is received at desktop computer receive instant messages addressed to the instant message identifier. Other electronic devices configured to receive instant messages may be used, such as a laptop computer, a personal data assistant (PDA) and a telephone receiver.

Instant messaging programs typically allow instant message senders to communicate in real-time with each other in a variety of ways. For example, many instant messaging programs allow instant message senders to send text as an instant message, to transfer files, and to communicate by voice. Examples of instant messaging communication applications include AIM (America Online Instant Messenger), AOL (America Online) Buddy List and Instant Messages which is an aspect of many client communication applications provided by AOL, Yahoo Messenger, MSN Messenger, and ICQ, among others. Although discussed above primarily with respect to instant message applications, other implementations are contemplated for providing similar functionality in platforms and online applications.

The techniques and concepts generally have been described in the context of an instant messaging system that uses an instant messaging host system to facilitate the instant messaging communication between instant message senders and instant message recipients. Other instant message implementations are contemplated, such as an instant message service in which instant messages are exchanged directly between two instant message client systems (e.g., an instant message sender system and an instant message recipient system).

In addition, although the examples above are given in an instant message context, other communications systems with similar attributes may be used. For example, some or all of the techniques may be applicable to messages exchanged in a chat mom or in electronic mail (e-mail) communications. Also, some or all of the described user interfaces may be a viewable interface, an audible interface, a tactile interface, or a combination of these.

In addition, the techniques and concepts describing sender-initiated forwarding of an instant message to a mobile telephone based on recipient contact information known by the sender may be applied to other contexts. For example, an e-mail message may be sent to an e-mail address known by the sender that corresponds to the recipient identified in the instant message. In other examples, sender-initiated forwarding of messages may be enabled to a voice telephone message or a second instant message address provided by another instant message service. In some implementations, a hierarchy of communication schemes may be identified. For example, an instant message may be first forwarded as a text message to a mobile telephone number known to the sender and, when the recipient is not available to receive the message at the mobile telephone, the message may be also forwarded as an e-mail message to an e-mail address of the intended recipient that is known to the sender. A hierarchy of communication schemes may be automatically applied to select among available contact criteria for a recipient of an instant message. In some implementations, a user may set a preference for the order in which available contact criteria are applies. For example, a user may prefer that a text message be forwarded to a mobile telephone number (if known) before an e-mail message is sent to an e-mail address (if known). A user may set a default preference that is applied to all contacts, unless overridden by a preference identified for a particular contact. For example, in general, a user may indicate that an instant message is forwarded to a mobile telephone number before being sent as a e-mail message; however, for a particular contact, an instant message is forwarded as an e-mail message before being a text message is forwarded to the mobile telephone number of the particular contact.

The techniques and concepts describing a buddy list that separates various identities into groups based on availability and/or communication scheme also may be applied to identity a group of buddies that are available via sending an e-mail message (and are otherwise offline and/or away).

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. As another example, a screen name is used throughout to represent a unique identifier of an account, but any other unique identifier of an account may be used. Accordingly, other implementations are within the scope of the following claims.

What is claimed is:

1. A method for communicating electronic messages, the method comprising:

receiving an electronic message;

receiving an indication of a user identifier specified by a sender as corresponding to the intended recipient of the electronic message;

determining, using at least one processor, that the intended recipient is not presently available to receive the electronic message;

maintaining a contact list for the sender, the contact list comprising user identifiers associated with recipients known to the user, the recipients having a first degree of separation from the sender;

accessing, for each one of the recipients on the sender's contact list, a contact list associated with each recipient;

designating the contacts listed in the contact lists of each recipient on the sender's contact list as being known to the user;

determining that the identity of the intended recipient is known to the sender based on the contact lists;

identifying, based on the determination that the intended recipient is known to the sender, a mobile telephone number associated with the intended recipient;

determining that the intended recipient is available to receive electronic messages; and sending the electronic message to the intended recipient based on the identified mobile phone number.

2. The method of claim 1 wherein the electronic message comprises an instant message.

3. The method of claim 1 wherein the user identifier comprises a screen name.

4. The method of claim 1 wherein determining the intended recipient is not presently available comprises determining the intended recipient is not signed on to an instant message service.

5. The method of claim 1 wherein determining that the identity of the intended recipient is known by the sender comprises searching a storage device for a user identifier contained in a collection of contact information associated with the sender.

6. The method of claim 5 wherein the collection of contact information comprises one of an address book associated with the sender or a buddy list associated with the sender.

7. The method of claim 1 wherein identifying a mobile telephone number associated with the intended recipient comprises searching the collection of contact information associated with the sender for a mobile telephone number associated with a user identifier corresponding to the intended recipient.

8. The method of claim 1 further comprising enabling a text message to be sent to the mobile telephone number, the text message comprising at least a portion of text of the electronic message.

9. The method of claim 1 further comprising forwarding a text message to the mobile telephone number, the text message comprising at least a portion of text of the electronic message.

10. The method of claim 1 wherein determining that the intended recipient is available to receive electronic messages comprises determining that the intended recipient does not prohibit transmission of electronic messages to the mobile telephone number.

11. The method of claim 10 further comprising sending the electronic message to the intended recipient only upon the determination that the intended recipient does not prohibit transmission of electronic messages to the mobile telephone number.

12. The method of claim 1 wherein determining that the intended recipient is not presently available comprises determining that the intended recipient is signed on to an instant message service used to send the electronic message and determining that the intended recipient is away from a client system used to access the instant message service.

13. The method of claim 12 wherein determining that the intended recipient is away from a client system used to access the instant message service comprises determining whether a user-configurable away indication is presently associated with the intended recipient.

14. The method of claim 1, further comprising:
accessing the contact lists of recipients at additional degrees of separation from the sender; and
designating the contacts listed in the contact lists of the recipients at each additional degree of separation as being known to the sender.

15. An apparatus for communicating electronic messages, the apparatus comprising:
a storage device that stores a set of instructions; and
at least one processor that executes to the set of instructions in the storage device, the execution of the set of instruction causing the at least one
processor to:
receive an electronic message;
receive an indication of a user identifier specified by a sender as corresponding to the intended recipient of the electronic message;
determine that the intended recipient is not presently available to receive the electronic message;
maintain a contact list for the sender, the contact list comprising user identifiers associated with recipients known to the user, the recipients having a first degree of separation from the sender;
access, for each one of the recipients on the sender's contact list, a contact list associated with each recipient;
designate the contacts listed in the contact lists of each recipient on the sender's contact list as being known to the user;
determine that the identity of the intended recipient is known to the sender based on the contact lists;
identify, based on the determination that the intended recipient is known to the sender, a mobile telephone number associated with the intended recipient;
determine that the intended recipient is available to receive electronic messages; and
send the electronic message to the intended recipient based on the identified mobile phone number.

16. The apparatus of claim 15 wherein the electronic message comprises an instant message.

17. The apparatus of claim 15 wherein the user identifier comprises a screen name.

18. The apparatus of claim 15 wherein the at least one processor further executes the set of instructions to:
determine the intended recipient is not signed on to an instant message service.

19. The apparatus of claim 15 wherein the at least one processor further executes the set of instructions to:
search for a user identifier contained in a collection of contact information associated with the sender.

20. The apparatus of claim 19 wherein the collection of contact information comprises one of an address book associated with the sender or a buddy list associated with the sender.

21. The apparatus of claim 15 wherein the at least one processor further executes the set of instructions to:
search the collection of contact information associated with the sender for a mobile telephone number associated with a user identifier corresponding to the intended recipient.

22. The apparatus of claim 15 wherein the at least one processor further executes the set of instructions to:
send a text message to the mobile telephone number, the text message comprising at least a portion of text of the electronic message.

23. The apparatus of claim 15 wherein the at least one processor further executes the set of instructions to:
forward a text message to the mobile telephone number, the text message comprising at least a portion of text of the electronic message.

24. The apparatus of claim 15 wherein the at least one processor further executes the set of instructions to:
determine that the intended recipient does not prohibit transmission of electronic messages to the mobile telephone number.

25. The apparatus of claim 24 wherein the at least one processor further executes the set of instructions to:
send the electronic message to the intended recipient only upon the determination that the intended recipient does not prohibit transmission of electronic messages to the mobile telephone number.

26. The apparatus of claim 15 wherein the at least one processor further executes the set of instructions to:
determine that the intended recipient is signed on to an instant message service used to send the electronic message and determine that the intended recipient is away from a client system used to access the instant message service.

27. The apparatus of claim 26 wherein the at least one processor further executes the set of instructions to:
determine whether a user-configurable away indication is presently associated with the intended recipient.

28. The apparatus of claim 15, wherein the at least one processor further executes the set of instructions to:
access the contact lists of recipients at additional degrees of separation from the sender; and
designate the contacts listed in the contact lists of the recipients at each additional degree of separation as being known to the sender.

* * * * *